(12) United States Patent
El-Sabbagh

(10) Patent No.: US 7,702,619 B2
(45) Date of Patent: Apr. 20, 2010

(54) METHODS AND SYSTEMS FOR JOINING DATABASE TABLES USING INDEXING DATA STRUCTURES

(76) Inventor: Alan El-Sabbagh, P.O. Box 2903, Jounieh (LB)

( * ) Notice: Subject to any disclaimer, the term of this patent is extended or adjusted under 35 U.S.C. 154(b) by 942 days.

(21) Appl. No.: 11/234,407

(22) Filed: Sep. 23, 2005

(65) Prior Publication Data

US 2007/0073759 A1  Mar. 29, 2007

(51) Int. Cl.
   *G06F 7/00*  (2006.01)
(52) U.S. Cl. ......................................................... 707/3
(58) Field of Classification Search ................. 707/1, 707/2, 8, 101, 3
   See application file for complete search history.

(56) References Cited

U.S. PATENT DOCUMENTS

| | | | |
|---|---|---|---|
| 4,817,036 A * | 3/1989 | Millett et al. ................... 707/1 |
| 5,594,898 A * | 1/1997 | Dalal et al. ..................... 707/2 |
| 5,666,525 A * | 9/1997 | Ross ............................. 707/2 |
| 6,144,957 A | 11/2000 | Cohen et al. |
| 6,167,399 A * | 12/2000 | Hoang ........................... 707/5 |
| 6,363,387 B1 | 3/2002 | Ponnekanti et al. |
| 6,505,188 B1 * | 1/2003 | Ghazal et al. .................. 707/2 |
| 6,618,720 B1 * | 9/2003 | On Au et al. ................... 707/2 |
| 6,694,323 B2 * | 2/2004 | Bumbulis ................... 707/101 |
| 6,708,178 B1 | 3/2004 | Chong et al. |
| 7,149,737 B1 * | 12/2006 | Luo et al. ....................... 707/8 |

OTHER PUBLICATIONS

Jones, K., TPFDF B+Tree Support, IBM Corporation, pp. 1-3, 1999.*
Silberschatz, Korth and Sudashan, Database Systems and Concepts, Book, Chapter 23.
Printouts from the Omnidex Web site (www.omnidex.com).
Printout listing publications of the Mistral Project, as well as publications available on the Mistral Project's Web site (mistral.in.tum.de).
Karayannidis, Nikos, et al., Processing Star Queries on Hierarchically-Clustered Fact Tables, Article, Athens, Hellas.
Fenk, Robert, The BUB-Tree, Article, pp. 1-3, Munich, Germany.
Fenk, Robert, et al., Interval Processing with the UB-Tree, Article, Munich, Germany.

(Continued)

*Primary Examiner*—Cheyne D Ly
(74) *Attorney, Agent, or Firm*—Owen Wiggs Green & Mutala LLP

(57) ABSTRACT

A method for identifying joined rows in a database comprising a plurality of tables. The method comprises selecting a group of tables directly or indirectly joined with each other, selecting an order of the group based on relationships among the tables, generating an intermediate data structure which identifies the group of tables, a number of virtual tables equal to one less than the number of tables in the group, and an indication of an adjacent table, and a common table and key for at least some of the group of tables and the virtual tables, generating indexing data structures for the group of tables and virtual tables, and, inserting information from rows of the group of tables into the indexing data structures using the intermediate data structure. The indexing data structure for one virtual table indicates which of the rows of the tables have common data elements.

12 Claims, 36 Drawing Sheets

JoinPathList Algorithm
   in: Base Tables $T_0...T_m$ to join
       Join Graph
       [<$T_j,K_j$>] a set of Keys and their relative tables to which belongs to add as keys for the last virtual table
   out: JoinPathList let $T_0...T_m$ be the base tables
   create 2 dynamic arrays QUEUE and PATH
   insert $T_0$ into PATH
   insert $T_0$ into QUEUE
   repeat
       $T_{Element}$ = First Table in QUEUE
       for every Link Item in Adjacent List of $T_{Element}$ from the Join Graph do
           if the Link Item is in the join sequence then
               if path doesn't contain the Link Item then
                   insert Link Item into PATH
                   insert Link Item into QUEUE
       remove $T_{Element}$ from QUEUE
   until QUEUE is empty

OTHER PUBLICATIONS

Ramsak, Frank, et al., Interactive ROLAP on Large Datasets: A Case Study with UB-Trees, Article, pp. 1-10, Munchen, Germany.

Zirkel, Martin, et al., Exploitation of Pre-sortedness for Sorting in Query Processing: The TempTris-Algorithm for UB-Trees, Article, Munchen, Germany.

Pieringer, Roland, et al.; HINTA: A Linearization Algorithm for Physical Clustering of Complex OLAP Hierarchies, Article, pp. 11-1-11-11, Munchen, Germany.

Markl, Volker, et al., The Transbase Hypercube RDBMS: Multidimensional Indexing of Relational Tables, Article, Munchen, Germany.

Fenk, Robert, et al., Bulk Loading A Data Warehouse Built Upon a UB-Tree, Article, Munich, Germany.

Volker, Markl, et al., A Cost Function for Uniformly Partitioned UB-Trees, Article, Munchen, Germany.

Ramsak, Frank, et al., Integrating the UB-Tree into a Database System Kernel, Article, Munchen, Germany.

Pieringer, Roland, et al., Modellierung und Verwaltung hierarchisch strukturierter Informationen in relationalen Datenbanksystemen, Article, Munchen, Germany.

Volker, Markl, et al., Processing Relational OLAP Queries with UB-Trees and Multidimensional Hierarchical Clustering, Article, Munchen, Germany.

Fenk, Robert, et al., Management and Query Processing of One Dimensional Intervals with the UB-Tree, Article, Munich, Germany.

Zirkel, Martin, et al., Efficient Processing of the Cube Operator, Article, Munchen, Germany.

Volker, Marlk, et al., Variable UB-Trees: An Efficient Way to Accelerate OLAP Queries, Book, pp. 79-88, Munchen, Germany.

Ramsak, Frank, et al., Physical Data Modeling for Multidimensional Access Methods, Article, Munchen, Germany.

Fenk, Robert, et al., Improving Multidimensional Range Queries of Non-Rectangular Volumes Specified by a Query Box Set, Article, Munich, Germany.

Patrick Valduriez, "Join Indices," ACM Transactions on Database Systems, vol. 12, No. 2, Jun. 1, 1987, ACM, New York, NY, USA, pp. 218-246.

Jiawen Han, et al. "Join Index Hierarchy: An Indexing Structure for Efficient Navigation in Object-Oriented Databases," IEEE Transactions on Knowledge and Data Engineering IEEE USA, (Online) vol. 11, No. 2, Mar. 1999, pp. 321-337.

Supplementary European Search Report issued by the European Patent Office in connection with corresponding European Application No. 06 76 1055 dated Sep. 10, 2008.

Volker, Markl, Improving OLAP Performance by Multidimensional Hierarchical Clustering, Article, Munchen, Germany.

Volker, Markl; MISTRAL: Processing Relational Queries Using a Multidimensional Access Technique, Article, Munchen, Germany.

Volker, Markl, Processing Operations with Restrictions in RDBMS Without External Sorting: The Tetris Algorithm, Article, Munchen, Germany.

Volker, Markl, The Tetris-Algorithm for Sorted Reading From UB-Trees, Article, Munchen, Germany.

Bayer, Rudolf, The UB-Tree: Performance of Multidimensional Range Queries, Book, pp. 1-14, Munchen, Germany.

Bayer, R., UB-Trees and UB-Cache—A New Processing Paradigm for Database Systems, Book, pp. 1-15, Munchen, Germany.

Bayer, Rudolf, The Universal B-Tree for Multidimensional Indexing, Book, pp. 1-14, Munchen, Germany.

* cited by examiner

Join Graph Algorithm in: Base Tables
out: Join Graph insert the base tables as vertexes of the graph
for every direct join between 2 tables $T_a$ and $T_b$ as defined by the DBA do
　　AdjacentList[$T_a$] += $T_b$ followed by the common key between $T_a$ and $T_b$
　　AdjacentList[$T_b$] += $T_a$ followed by the common key between $T_b$ and $T_a$

Figure 2A

JoinPathList Algorithm in: Base Tables $T_0...T_m$ to join
   Join Graph
   $[<T_j,K_j>]$ a set of Keys and their relative tables to which belongs to add as keys for the last virtual table out: JoinPathList let $T_0...T_m$ be the base tables
create 2 dynamic arrays QUEUE and PATH
insert $T_0$ into PATH
insert $T_0$ into QUEUE
repeat
   $T_{Element}$ = First Table in QUEUE
   for every Link Item in Adjacent List of $T_{Element}$ from the Join Graph do
      if the Link Item is in the join sequence then
         if path doesn't contain the Link Item then
            insert Link Item into PATH
            insert Link Item into QUEUE
   remove $T_{Element}$ from QUEUE
until QUEUE is empty

Figure 3A

JoinPathList Algorithm (continued)

insert all the names of base tables from PATH as vertexes in the JoinPathList
create a local buffer BUF
insert into BUF the first entry from PATH
for all the remainder entries in PATH do
    take one $T_i$ at a time
    JoinPathAdjacentList($T_i$) = $T_{[buf]}$
    Key($T_i$) = getFirstAdjacentListKey($T_i$, $T_{[buf]}$)
    JoinPathAdjacentList($T_{[buf]}$) = $T_i$
    Key($T_{[buf]}$) = getFirstAdjacentListKey ($T_{[buf]}$, $T_i$)
    $T_{[buf]}$ + = $T_i$
    Insert NodesList[$T_{[buf]}$ ] = $T_{[buf]}$

Figure 3B

JoinPathList Algorithm (continued)

Add set [<$T_j$, $K_j$>] as common tables and common Keys for the last virtual table create a structure BUF2 with 2 fields: Table and Key
for all the tables in JoinPathList going downward do
  take one $T_{[i]}$ at a time
  for all Base Tables in $T_{[i]}$ do
    take one $T_k$ at a time
    for all the couples of <Table,key> in BUF2 do
      take one couple $buf_c$ at a time
      if ($buf_c$.Table = $T_k$) then
        if ($buf_c$.key != Key($T_{[i]}$) ) and ($buf_c$.key not in InheritedKey($T_{[i]}$)) then
          InheritedKey($T_{[i]}$) += $buf_c$ if $T_{[i]}$ is not a base table then
  if $T_l$ is the table from which comes Key($T_{[i]}$) and $k_l$ is the respective key then
    BUF2.Table = $T_l$
    BUF2.Key = $k_l$

Figure 3C getFirstAdjacentListKey Algorithm in: $T_{[j]}$ & $T_{[k]}$ out: First common key between $T_{[j]}$ & $T_{[k]}$ and which base table of $T_{[j]}$ belongs for every base table in $T_{[j]}$ do
   take one $T_i$ at a time
   for every Link Item in Adjacent Link of $T_i$ in the Join Graph do
      Take one $T_{Link(l)}$ at a time
      for every Base Table in $T_{[k]}$ do
         Take one $T_m$ at a time
         if $T_{Link(l)} = T_m$ then
            return(key($T_i$, $T_{Link(l)}$)) as a common key &
            $T_i$ as the base table

Figure 3D create B+Trees Algorithm
in: JoinPathList
out: B+Trees give a general name for the B^JoinTree
for all entries in JoinPathList do
    take one node at a time
    create a B+Tree for the node defined as
        name of the B+Tree equal to the name of B^JoinTree followed by the
            index number of the node entry
        Number of data pointers equal to the number of base tables
            constituting the virtual table of the node
        Key is defined by the pair <Table, Key> in the adjacent list of the
            node
        Inherited Keys are defined by the pairs <Table, Inheritred Key> in
            the adjacent list of the node

Figure 7A

Insert Algorithm in: row $R_m$ from table $T_i$

- Locate the entry of $T_i$ in the JoinPathList
- From its adjacent List, locate the definition of the keys and inherited keys
- From Row $R_m$ get the columns constituting the keys and the inherited keys
- Call AddJoinKey ($T_i$, Keys$_i$, InheritedKeys$_i$, DP$_i$) where DP$_i$ is the row id of row $R_m$

Notice that Keys$_i$, InheritedKeys$_i$ and DP$_i$ are relative to the row $R_m$ from table $T_i$

Figure 7B

AddJoinKey Algorithm in: $T_{[i]}$ Virtual or base table
  $Keys_{[i]}$
  $InheritedKeys_{[i]}$
  $[DP_i]$

- Call AddKey (B$^+$Tree($T_{[i]}$), keys$_{[i]}$, InheritedKeys$_{[i]}$, [DP$_i$]) for the index of table $T_{[i]}$
- Locate the entry of $T_{[i]}$ in the JoinPathList
- From its adjacent List, locate the Table $T_{[k]}$ adjacent to it and do the following:
  - Locate the entry of $T_{[k]}$ in the JoinPathList
  - FindKey(B$^+$Tree($T_{[k]}$), Keys$_{[i]}$)
  - While found(keys[i]) do
    ReturnKeys(B$^+$Tree($T_{[k]}$), keys$_{[k]}$, InheritedKeys$_{[k]}$, [DP$_k$])
    Locate the entry of $T_{[ik]}$ in the JoinPathList
    From its adjacent List, locate the definition of the keys and inherited keys
    From keys$_{[i]}$, inheritedkeys$_{[i]}$, keys$_{[k]}$, inheritedkeys$_{[k]}$ get the keys and inherited keys of $T_{[ik]}$
    AddJoinKey ($T_{[ik]}$, Keys$_{[ik]}$, InheritedKeys$_{[ik]}$, [DP$_{ik}$])
    NextKey(B$^+$Tree($T_{[k]}$), Keys$_{[i]}$)

Figure 7C

Delete Algorithm in: row $R_m$ from table $T_i$

- Locate the entry of $T_i$ in the JoinPathList
- From its adjacent List, locate the definition of the keys and inherited keys
- From Row $R_m$ get the columns constituting the keys and the inherited keys
- Call DelJoinKey ($T_i$, Keys$_i$, InheritedKeys$_i$, $DP_i$) where $DP_i$ is the row id of row $R_m$

Notice that Keys$_i$, InheritedKeys$_i$ and DP$_i$ are relative to the row $R_m$ from table $T_i$

Figure 7D

DelJoinKey Algorithm in: $T_{[i]}$ Virtual or base table
  $Keys_{[i]}$
  $InheritedKeys_{[i]}$
  $[DP_i]$

- Call DelKey (B⁺Tree($T_{[i]}$), $keys_{[i]}$, InheritedKeys$_{[i]}$, [DP$_i$]) for the index of table $T_{[i]}$
- Locate the entry of $T_{[i]}$ in the JoinPathList
- From its adjacent List, locate the Table $T_{[k]}$ adjacent to it and do the following:
  - Locate the entry of $T_{[k]}$ in the JoinPathList
  - FindKey(B⁺Tree($T_{[k]}$), Keys$_{[i]}$)
  - While found(keys[i]) do
    ReturnKeys(B⁺Tree($T_{[k]}$), keys$_{[k]}$, InheritedKeys$_{[k]}$, [DP$_k$])
    Locate the entry of $T_{[ik]}$ in the JoinPathList
    From its adjacent List, locate the definition of the keys and inherited keys
    From keys$_{[i]}$, inheritedkeys$_{[i]}$, keys$_{[k]}$, inheritedkeys$_{[k]}$ get the keys and inherited keys of $T_{[ik]}$
    DelJoinKey ($T_{[ik]}$, Keys$_{[ik]}$, InheritedKeys$_{[ik]}$, [DP$_{ik}$])
    NextKey(B⁺Tree($T_{[k]}$), Keys$_{[i]}$)

Figure 7E

Employees 602

| | EMPLOYEE_ID | NAME | EMAIL | PHONE_NUMBER | HIRE_DATE | JOB_ID | SALARY | DEPARTMENT_ID |
|---|---|---|---|---|---|---|---|---|
| 0 | 101 | Mark Stench | mstench | 233-4268 | 12/02/1998 | FI_MGR | 60000 | FIN |
| 1 | 102 | Jorge Perez | jperez | 448-5268 | 05/14/1999 | AC_MGR | 60000 | ACC |
| 2 | 103 | Edward Cartier | ecartier | 742-8429 | 03/01/2003 | SA_MGR | 60000 | SAL |
| 3 | 104 | Teresa Gonzalez | tgonzalez | 134-8329 | 12/20/2002 | AC_AUD | 55000 | ACC |
| 4 | 105 | Michelle Blanche | mblanche | 745-7496 | 01/02/2001 | SA_REP | 35000 | SAL |

Figure 9A

Job_History 604

| | EMPLOYEE_ID | START_DATE | END_DATE | JOB_ID | DEPARTMENT_ID |
|---|---|---|---|---|---|
| 0 | 101 | 12/16/1998 | 12/15/1999 | AC_AUD | ACC |
| 1 | 102 | 05/16/1999 | 05/15/2001 | AC_AUD | ACC |
| 2 | 101 | 12/16/1999 | 12/15/2001 | SA_REP | SAL |
| 3 | 103 | 03/16/2003 | 03/15/2004 | AC_AUD | ACC |

Figure 9B

Departments 606

| | Deparment_Id | Department_Name | Manager_Id | Location_Id |
|---|---|---|---|---|
| 0 | FIN | FINANCE | 101 | 1000 |
| 1 | ACC | ACCOUNTING | 102 | 1010 |
| 2 | SAL | SALES | 103 | 1020 |

Figure 9C

Jobs  ⟵ 608

| | JOB_ID | JOB_TITLE | MIN_SALARY | MAX_SALARY |
|---|---|---|---|---|
| 0 | AC_AUD | Accounting Auditor | 30000 | 60000 |
| 1 | AC_MGR | Accounting Manager | 60000 | 70000 |
| 2 | FI_MGR | Finance Manager | 50000 | 70000 |
| 3 | SA_MGR | Sales Manager | 50000 | 60000 |
| 4 | SA_REP | Sales Representative | 30000 | 40000 |

Figure 9D

Locations  ⟵ 610

| | LOCATION_ID | STREET_ADDRESS | POSTAL_CODE | CITY | STATE_PROVINCE | COUNTRY_ID |
|---|---|---|---|---|---|---|
| 0 | 1000 | 22220 Cochrane Drive | V6V 2T9 | Richmond | B.C. | ca |
| 1 | 1010 | Calle Sermiento numero 300 | 62547 | Guadalajara | Baja | me |
| 2 | 1020 | Rue des fleurs n. 345 | 78921 | Toulouse | Moyenne | fr |

Figure 9E

Countries  ⟵ 612

| | Country_Id | Country_Name |
|---|---|---|
| 0 | ca | Canada |
| 1 | fr | France |
| 2 | me | Mexico |

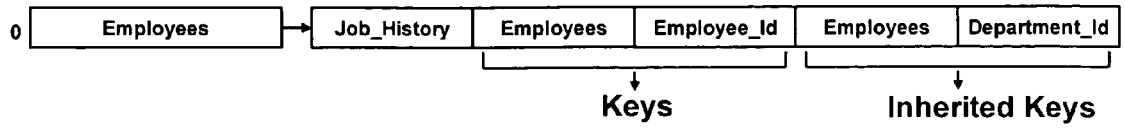
Figure 10A
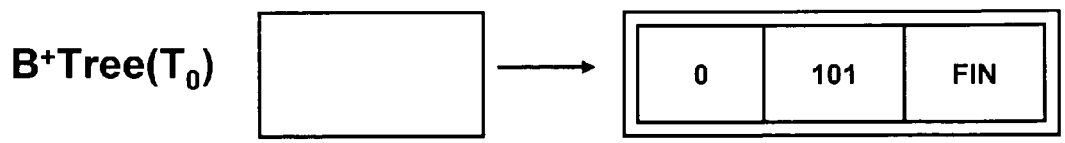
Figure 10B
B+Tree(T$_0$) → | 0 | 101 | FIN |
Figure 10C

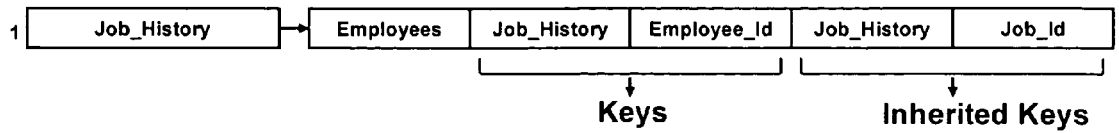
Figure 11A
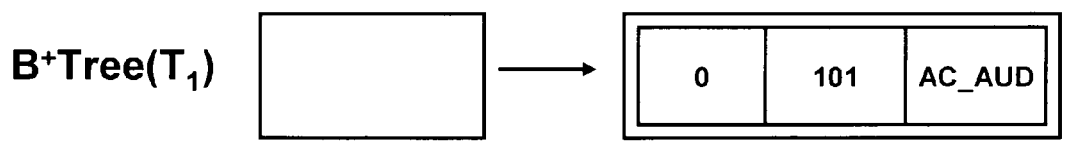
Figure 11B
Figure 11C
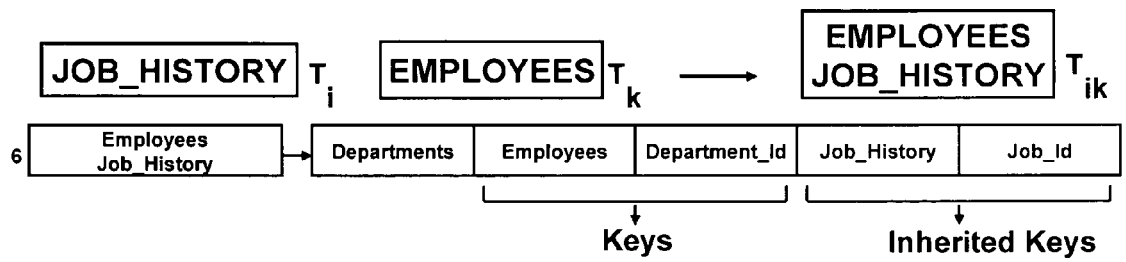
Figure 11D
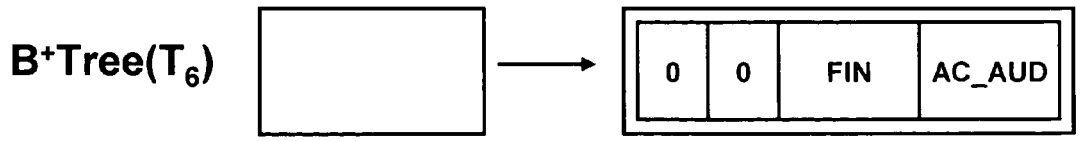
Figure 11E

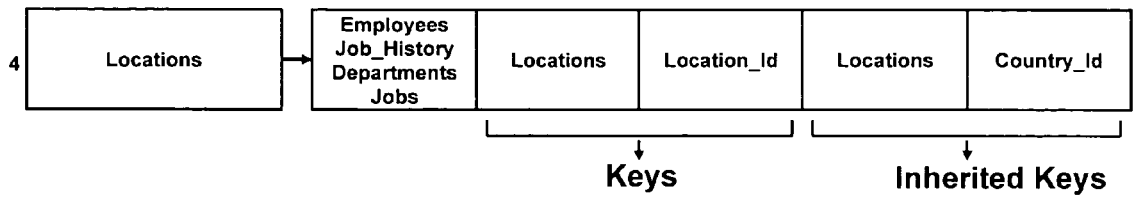
Figure 12A
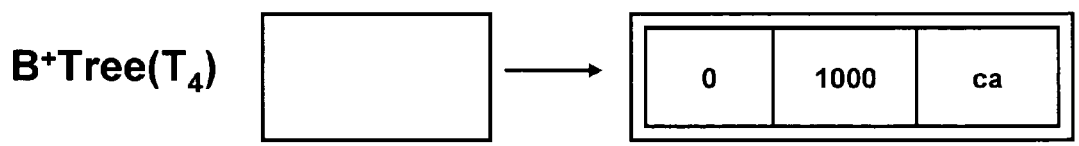
Figure 12B
Figure 12C

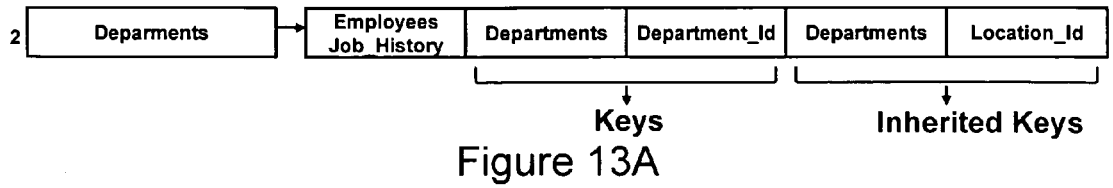
Figure 13A
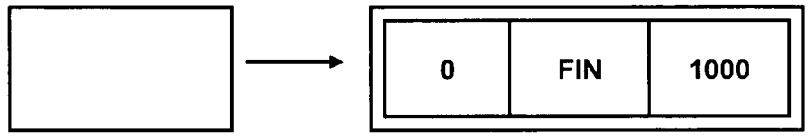
Figure 13B
B⁺Tree($T_2$)
Figure 13C
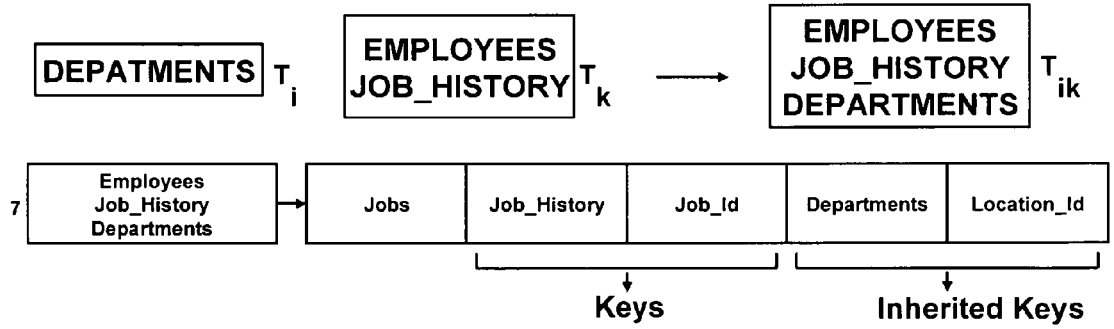
Figure 13D
B⁺Tree($T_7$)
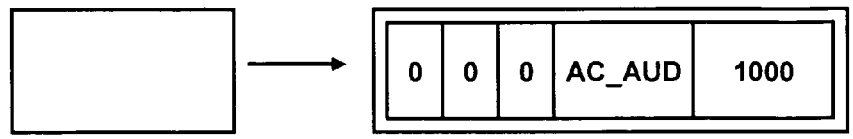
Figure 13E

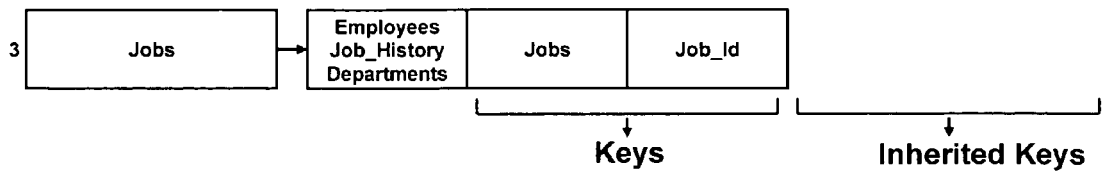
Figure 14A
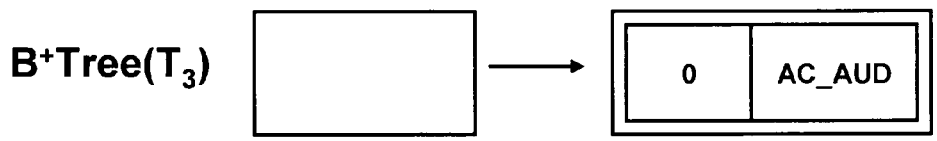
Figure 14B
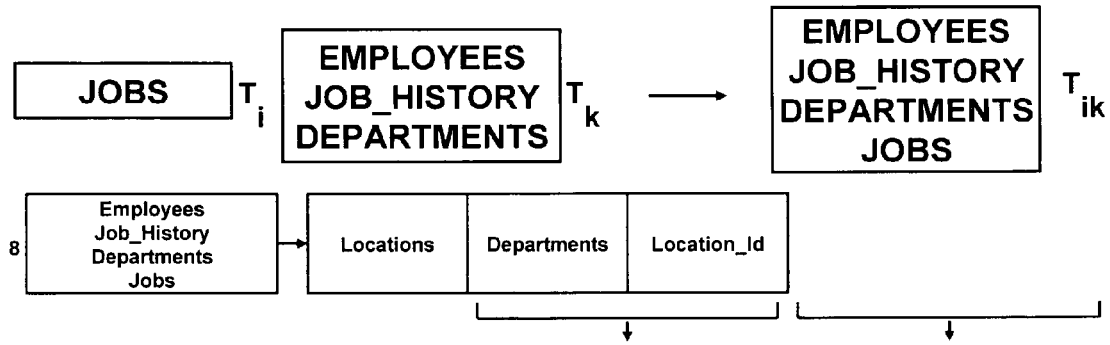
Figure 14C
Figure 14D
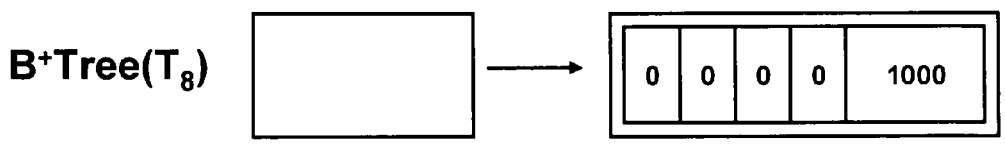
Figure 14E

B+Tree(T0)

| 0 | 101 | FIN |
|---|---|---|

| 1 | 102 | ACC |
|---|---|---|

| 2 | 103 | SAL |
|---|---|---|

| 3 | 104 | ACC |
|---|---|---|

| 4 | 105 | SAL |
|---|---|---|

Figure 16A

B+Tree(T$_1$)

| 0 | 101 | AC_AUD |
|---|---|---|

| 2 | 101 | SA_REP |
|---|---|---|

| 1 | 102 | AC_AUD |
|---|---|---|

| 3 | 103 | AC_AUD |
|---|---|---|

Figure 16B

B+Tree(T$_2$)

| 1 | ACC | 1010 |
|---|---|---|

| 0 | FIN | 1000 |
|---|---|---|

| 2 | SAL | 1020 |
|---|---|---|

Figure 16C

B+Tree(T$_3$)

| 0 | AC_AUD |
|---|---|

| 1 | AC_MGR |
|---|---|

| 2 | FI_MGR |
|---|---|

| 3 | SA_MGR |
|---|---|

| 4 | SA_REP |
|---|---|

Figure 16D

B+Tree(T$_4$)

| 0 | 1000 | ca |
|---|---|---|

| 1 | 1010 | me |
|---|---|---|

| 2 | 1020 | fr |
|---|---|---|

Figure 16E

B+Tree(T$_5$)

| 0 | ca |
|---|---|

| 1 | fr |
|---|---|

| 2 | me |
|---|---|

Figure 16F

B⁺Tree(T₆)

| 1 | 1 | ACC | AC_AUD |
|---|---|-----|--------|

| 0 | 0 | FIN | AC_AUD |
|---|---|-----|--------|

| 0 | 2 | FIN | SA_REP |
|---|---|-----|--------|

| 2 | 3 | SAL | AC_AUD |
|---|---|-----|--------|

Figure 16G

B⁺Tree(T₇)

| 0 | 0 | 0 | AC_AUD | 1000 |
|---|---|---|--------|------|

| 2 | 3 | 2 | AC_AUD | 1020 |
|---|---|---|--------|------|

| 1 | 1 | 1 | AC_AUD | 1010 |
|---|---|---|--------|------|

| 0 | 2 | 0 | SA_REP | 1000 |
|---|---|---|--------|------|

Figure 16H

B⁺Tree(T₈)

| 0 | 0 | 0 | 0 | 1000 |
|---|---|---|---|------|

| 0 | 2 | 0 | 4 | 1000 |
|---|---|---|---|------|

| 1 | 1 | 1 | 0 | 1010 |
|---|---|---|---|------|

| 2 | 3 | 2 | 0 | 1020 |
|---|---|---|---|------|

Figure 16I

B⁺Tree(T₉)

| 0 | 0 | 0 | 0 | 0 | ca |
|---|---|---|---|---|----|

| 0 | 2 | 0 | 4 | 0 | ca |
|---|---|---|---|---|----|

| 2 | 3 | 2 | 0 | 2 | fr |
|---|---|---|---|---|----|

| 1 | 1 | 1 | 0 | 1 | me |
|---|---|---|---|---|----|

Figure 16J

B⁺Tree(T₁₀)

| 0 | 0 | 0 | 0 | 0 | 0 |
|---|---|---|---|---|---|

| 0 | 2 | 0 | 4 | 0 | 0 |
|---|---|---|---|---|---|

| 1 | 1 | 1 | 0 | 1 | 2 |
|---|---|---|---|---|---|

| 2 | 3 | 2 | 0 | 2 | 1 |
|---|---|---|---|---|---|

METHODS AND SYSTEMS FOR JOINING DATABASE TABLES USING INDEXING DATA STRUCTURES

TECHNICAL FIELD

The invention relates to databases, and to methods and systems for implementing join operations within indexing data structures such as, for example, B+Trees.

BACKGROUND

A database may comprise a set of tables, each table having one or more columns and a plurality of rows. Each table may be indexed using a B-Tree. A B-Tree is a tree data structure which can be used to identify selected rows of a single table based on certain keys. The time required to insert, delete or search for keys in a B-Tree varies logarithmically with the number of data elements in the B-Tree.

Some databases employ a variation of the B-Tree known as a B+Tree. A B+Tree differs from a standard B-Tree in that all row identifiers are stored in the leaves of a B+Tree.

Databases often include a number of related or "joined" tables. Two tables are joined if each of the tables includes one or more columns that are related to corresponding columns in the other one of the tables. When such a database is queried to locate all rows having a particular data element (referred to as a "key"), some prior art systems execute a join for all of the tables of the database to produce a join table. A join is an operation wherein all of the rows of all of the tables of the database are scanned to identify rows containing the key specified by the query. Performing join operations can be time consuming.

Performance has been always a challenge for relational database systems. A major problem with relational database systems is that a good relationship schema requires many tables having columns in common between them. Accordingly, it is often necessary to calculate many joins to execute queries.

A database administrator typically spends a lot of time to tune the structure of a database to permit queries to be executed efficiently. In order to reduce the number of joins required to execute queries, some database schemas avoid the use of normal forms such as the Boyce-Codd normal form (BCNF). One prior art example of such a schema is known as the "Star Schema". The Star Schema was developed to simplify joins. A database organized according to the Star Schema typically has one main table or "fact table", and a plurality of other tables or "dimension tables" which are each in direct join with the fact table.

Another example of a prior art system for dealing with joins is the bitmap join index originated by the Oracle Corporation of Redwood Shores, Calif. A bitmap join index has pre-joined the tables. Queries can quickly retrieve row ID lists of matching table rows in all tables by consulting the bitmap join index. Some restrictions on using the bitmap join index include:

indexed columns must be of low cardinality;

SQL queries must not have any references in their WHERE clauses to data columns that are not contained in the index; and, updating bitmap join indexes involves substantial overhead.

In practice, bitmap join indexes are typically rebuilt each evening to incorporate data changes made by daily batch load jobs. Accordingly, bitmap join indexes may be unsuitable for databases that are modified during the processing day.

The inventor has developed efficient systems to make join tables available for a database without the need to calculate them each time the database is queried, and without avoiding the use of normal forms or limiting the number of distinct values in the columns of the tables.

SUMMARY

The following embodiments and aspects thereof are described and illustrated in conjunction with systems, tools and methods which are meant to be exemplary and illustrative, not limiting in scope.

One aspect of the invention provides a method for identifying joined rows in a database comprising a plurality of tables. The method comprises selecting a group of tables from the plurality of tables, each table of the group of tables being directly or indirectly joined with each of the other tables in the group of tables, selecting an order of the group of tables, generating an intermediate data structure comprising information identifying each of the group of tables, a number of virtual tables equal to one less than a number of tables of the group of tables, each virtual table comprising information identifying two or more of the group of tables, and an indication of an adjacent table, a common table and a common key for at least some of the group of tables and the virtual tables, generating an indexing data structure for each of the group of tables and virtual tables, and, inserting data pointers and data elements from rows of the group of tables into the indexing data structures using the intermediate data structure. The tables may be ordered based on relationships among the group of tables. The indexing data structure for one of the virtual tables indicates which of the rows of the group of tables have common data elements.

Another aspect of the invention provides a database system comprising a database having a plurality of tables stored therein, a database management system for modifying the database, a $B^{Join}$Tree creation system for creating at least one $B^{Join}$Tree, the at least one $B^{Join}$Tree comprising an indexing data structure that indicates which of the rows of tables of the database have common data elements, a row insertion system configured to receive a row insertion signal from the database management system upon insertion of a row into a table of the database for updating the at least one $B^{Join}$Tree to reflect the inserted row, a row deletion system configured to receive a row deletion signal from the database management system upon deletion of a row into a table of the database for updating the at least one $B^{Join}$Tree to reflect the deleted row, and, a query system for scanning the $B^{Join}$Tree for the indexing data structure that indicates which of the rows of tables of the database have common data elements and for retrieving rows of tables from the database which satisfy a join condition specified in a query using the indexing data structure to provide an answer set.

Another aspect of the invention provides a computer readable medium carrying data structures for facilitating execution of queries of a database comprising a plurality of tables. The data structures comprise a relation-indicating data structure comprising names of a group of tables from the plurality of tables, each table of the group of tables being directly or indirectly joined with each of the other tables in the group of tables, a number of virtual tables equal to one less than a number of tables of the group of tables, and, an indication of an adjacent table, a common table and a common key for at least some of the group of tables and the number of virtual tables. The data structures also comprise an indexing data structure for each of the group of tables and the number of virtual tables, the indexing data structure for a last of the virtual tables indicating which of the rows of the group of tables have common data elements.

In addition to the exemplary aspects and embodiments described above, further aspects and embodiments will become apparent by reference to the drawings and by study of the following detailed descriptions.

BRIEF DESCRIPTION OF DRAWINGS

Exemplary embodiments are illustrated in referenced figures of the drawings. It is intended that the embodiments and figures disclosed herein are to be considered illustrative rather than restrictive.

In drawings which illustrate non-limiting embodiments of the invention:

FIG. 2A shows pseudo-code for an example algorithm for creating a JoinGraph;

FIGS. 3A-C show pseudo-code for an example algorithm for creating a JoinPathList;

FIG. 3D shows pseudo-code for an example algorithm for determining a common table and key for two input tables;

FIG. 7A shows pseudo-code for an example algorithm for creating $B^+$Trees for a $B^{Join}$Tree;

FIG. 7B shows pseudo-code for an example algorithm for inserting information from a row of a table into a $B^{Join}$Tree;

FIG. 7C shows pseudo-code for an example recursive algorithm called by the algorithm of FIG. 7B;

FIG. 7D shows pseudo-code for an example algorithm for deleting information from a row of a table from a $B^{Join}$Tree;

FIG. 7E shows pseudo-code for an example recursive algorithm called by the algorithm of FIG. 7D;

FIGS. 9A-F show the base tables of the FIG. 8 example;

FIGS. 10A-C illustrate steps for inserting information from the first row from the table Employees of FIG. 9A into a $B^{Join}$Tree;

FIGS. 11A-E illustrate steps for inserting information from the first row from the table Job_History of FIG. 9B into a $B^{Join}$Tree;

FIGS. 12A-C illustrate steps for inserting information from the first row from the table Locations of FIG. 9E into a $B^{Join}$Tree;

FIGS. 13A-E illustrate steps for inserting information from the first row from the table Departments of FIG. 9C into a $B^{Join}$Tree;

FIGS. 14A-G illustrate steps for inserting information from the first row from the table Jobs of FIG. 9D into a $B^{Join}$Tree;

FIGS. 15A-E illustrate steps for inserting information from the first row from the table Countries of FIG. 9F into a $B^{Join}$Tree;

FIGS. 16A-K show completed $B^+$Trees of a $B^{Join}$Tree after information from all of the rows of the tables of FIGS. 9A-F have been inserted;

DESCRIPTION

Figure 1A:
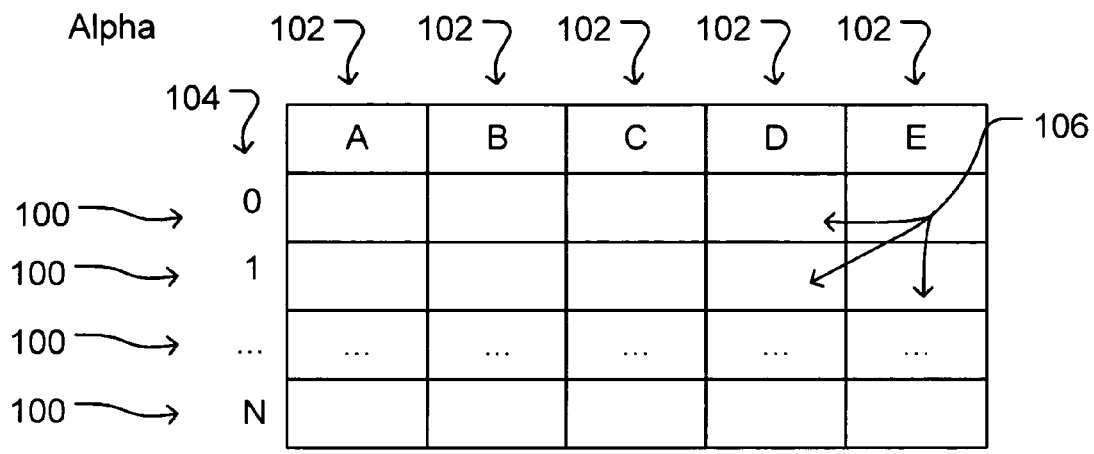
FIGS. 1A-C illustrate three example base tables.

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

The invention provides methods and systems for managing databases having tables which have one or more related columns. Such tables are referred to as being in "direct join" with one another. Direct joins may be specified by a database administrator who defines the tables and columns for the database. Also, a direct join between two tables may sometimes be specified by a query which is used to search for a correlation between two differently-named columns. The two differently-named columns may be from different tables, in which case those tables are considered to be in direct join for the purpose of the query, or may be from the same table, in which case that table is said to be in "self join." A table in self join may be considered as two tables in direct join for the purpose of the query, as described further below. Two tables which are in direct join are said to be "adjacent tables". Some embodiments of the invention provide methods for identifying rows from a group of tables which have common data elements, which are referred to as rows in join or "joined rows".

Each table in a database has a name that identifies the table. It is to be understood that the names used in methods and systems according to the invention need not be the same as the names, if any, given to the tables by a database administrator. All that is required for a table's name is that, given the name, the table may be unambiguously identified.

Methods according to some embodiments of the invention comprise selecting a group of tables in join and ordering the tables in the group. The tables may be ordered based on relationships among the tables. Such a method generates an intermediate or relation-indicating data structure comprising the group of tables, a number of virtual tables equal to one less than the number of tables in the group, and an indication of adjacent tables and common columns for at least some of the group of tables and the virtual tables. Data pointers and data elements from rows of the group of tables are inserted into indexing data structures, using the intermediate data structure, to indicate which of the rows of the subset of tables have common data elements. The following description includes examples of how one embodiment of such a method may be implemented, but it is to be understood that such methods could be implemented using different steps.

Systems according to some embodiments of the invention produce data structures referred to herein as "B$^{Join}$Trees" from which rows having one or more data elements in common with each other ("joined rows") may be readily identified. One embodiment of the invention provides a method for producing a B$^{Join}$Tree by the following steps:

1. Generate a JoinGraph from the tables which are in direct join with one another.
2. Generate a JoinPathList from the tables and their adjacent tables and keys in the JoinGraph.
3. Insert data pointers and data elements such as keys and inherited keys from rows of the tables into indexing data structures such as B$^+$Trees driven by the JoinPathList.

Each of the above steps are explained in detail in the following description.

Figure 1B:
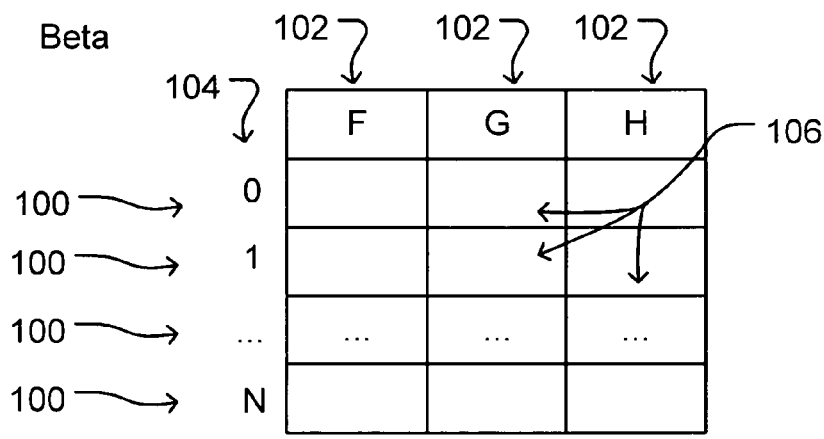
Figure 1C:
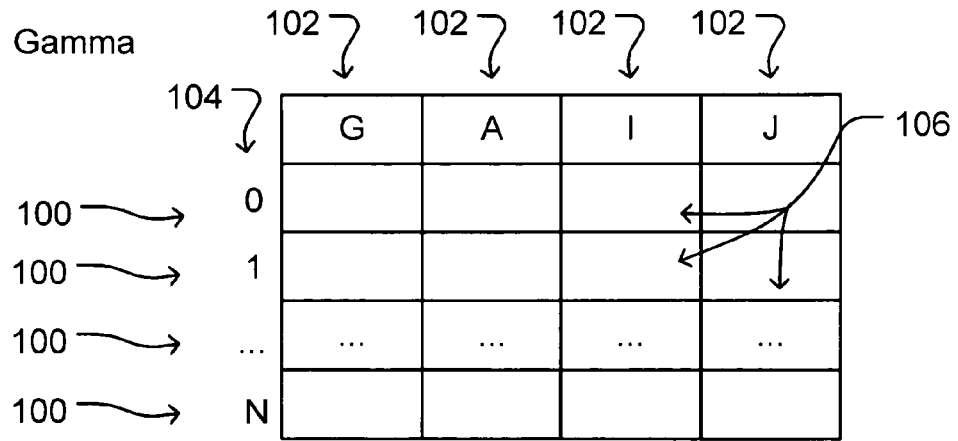

FIGS. 1A-C show three example tables, Alpha, Beta and Gamma. Each table comprises a plurality of rows 100 and columns 102. Each row 100 has a data pointer 104 associated therewith. Each data pointers 104 may comprise information which identifies the associated row 100 of that table. Data pointers 104 may comprise row numbers for rows 100 of their respective tables, or may comprise other information which may be used to identify the associated rows 100. Data elements 106 are stored in rows 100 under each column 102. Columns 102 may be used to index the tables, and are sometimes referred to as "keys". In some situations, two or more columns may together comprise a key. Tables Alpha, Beta and Gamma are referred to herein as "base tables". Base tables are database objects whose structure and the data elements they contain are stored in electronic memory, another computer-readable storage medium, or other data storage means.

Base tables Alpha and Beta do not have any common or related columns, so these tables are not in direct join. Base tables Alpha and Gamma are in direct join with each other, because they both include column "A". Base tables Beta and Gamma are also in direct join with each other, because they both include column "G". Thus, Alpha and Gamma are adjacent tables, as are Beta and Gamma. Tables Alpha and Beta are not adjacent, but are indirectly joined because each is in direct join with table Gamma. It is to be understood that two tables need not have columns with the same name to be in direct join. For example, two tables may be in direct join if they contain related columns, as specified by the database administrator or a query.

Generating a JoinGraph

A JoinGraph is a data structure which indicates which of the base tables in a database, or which of the base tables in a subset of tables in a database, are adjacent to one another. Each base table identified in a JoinGraph is in direct join with at least one other table in the JoinGraph. Each of the base tables in a JoinGraph is either directly or indirectly joined with every other table in the JoinGraph.

A JoinGraph may be represented graphically, with each of the base tables represented by a vertex or node of the graph, and an edge connecting each pair of tables in direct join. Alternatively, a JoinGraph may be represented as a linked list comprising a nodes list, which lists the base tables as vertexes of the JoinGraph, and an adjacent list, which lists all of the adjacent tables for each vertex of the JoinGraph.

A JoinGraph may also specify, for each adjacent table, a key which it shares with the associated base table. The key may identify one or more columns shared between the base table and its adjacent table. A JoinGraph may be generated, for example, by the following method:

1. Insert the names of the base tables into the nodes list as vertexes of the JoinGraph.
2. For every direct join between 2 tables $T_a$ and $T_b$:
   a. insert the name of table $T_a$ in the adjacent list for table $T_b$, followed by the name of the key (which may comprise one or more columns) of $T_b$ which is shared by $T_a$, which is referred to as the common key between $T_b$ and $T_a$; and,
   b. insert the name of table $T_b$ in the adjacent list for table $T_a$, followed by the common key between $T_a$ and $T_b$.

FIG. 2A shows example pseudo-code of an algorithm for generating a JoinGraph. In the pseudo-code of FIG. 2A, "DBA" stands for database administrator, and refers to the person or persons responsible for setting up the database and defining the columns of the various base tables, as well as the joins between the tables.

FIGS. 2B-F show the creation of an example JoinGraph 200, comprising nodes list 202 and an adjacent list 204. JoinGraph 200 is useful in constructing a JoinPathList for the base tables Alpha, Beta and Gamma, as discussed below.

Figure 2B:
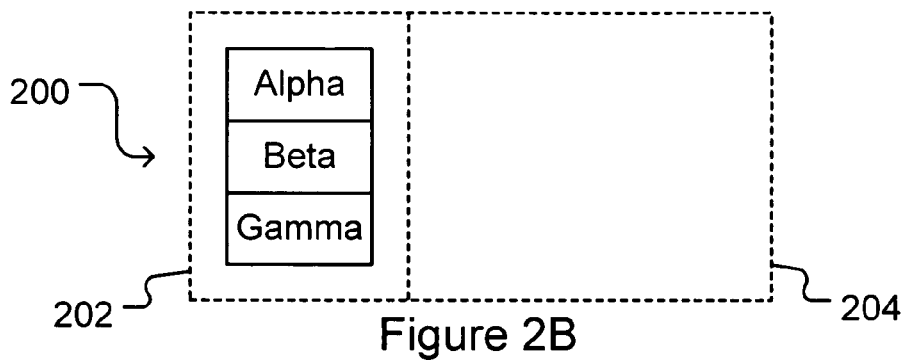
FIGS. 2B-F illustrate steps involved in creating a Join-Graph for the example tables of FIGS. 1A-C.
Figure 2C:
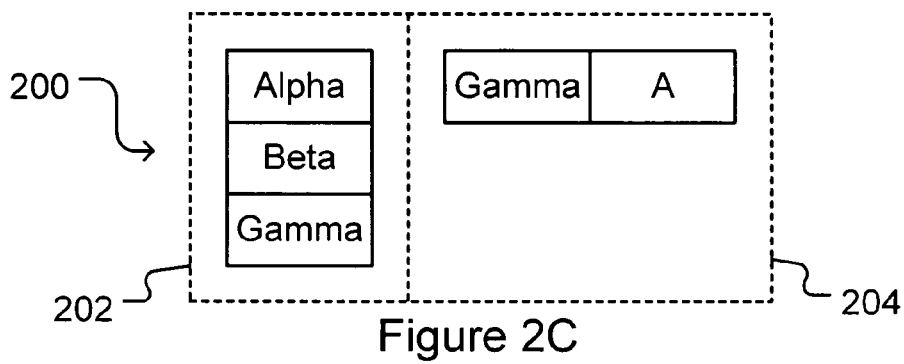
Figure 2D:
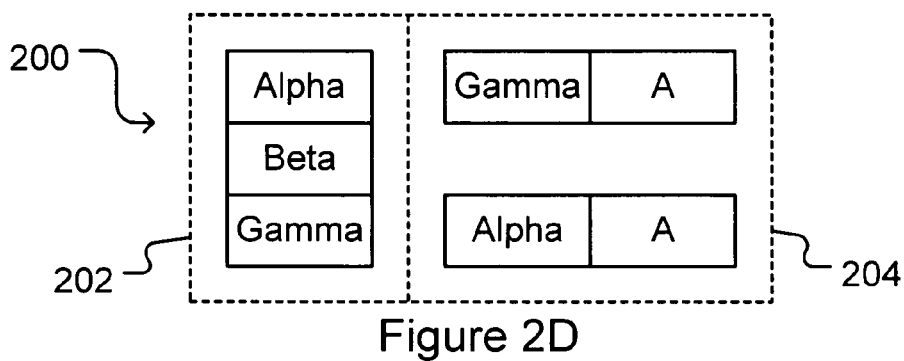
Figure 2E:
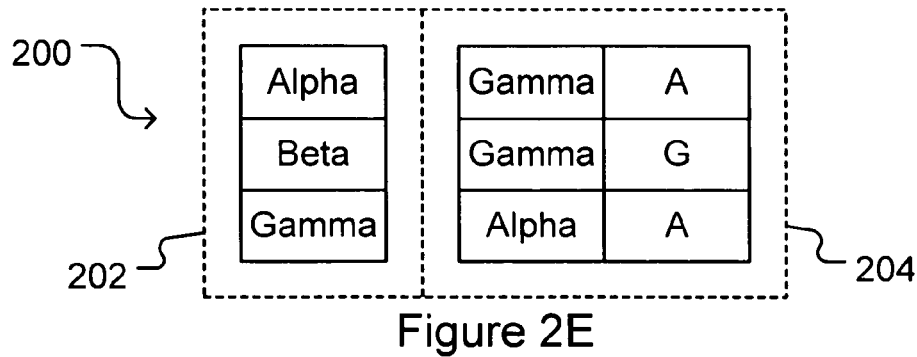
Figure 2F:
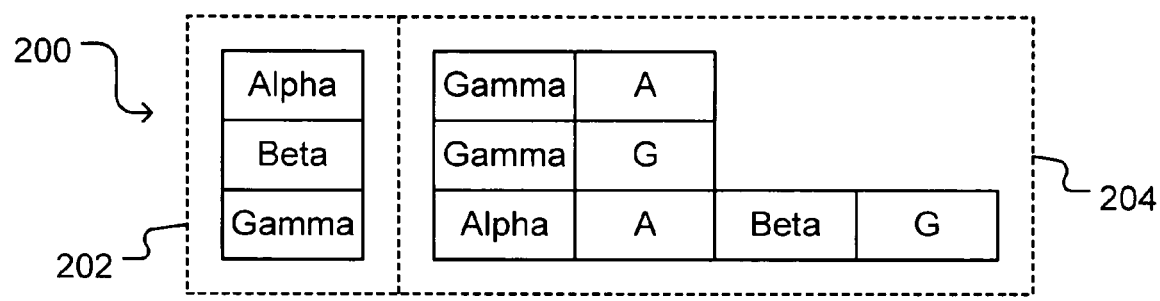
Figure 2G:
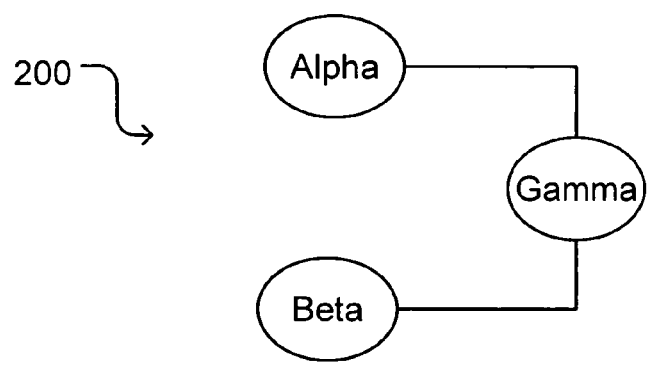
FIG. 2G is a graphical representation of the JoinGraph of FIG. 2F.

The first step in generating JoinGraph 200 comprises inserting the names of the base tables as nodes list 202 of JoinGraph 200, as shown in FIG. 2B. Next, the names of the base tables in direct join with each base table in nodes list 202 are inserted in adjacent list 204. As shown in FIG. 2C, the name of base table Gamma is inserted in adjacent list 204 as an adjacent table to base table Alpha, along with the name of the common key "A" between Alpha and Gamma. Likewise, as shown in FIG. 2D, the name of base table Alpha is inserted in adjacent list 204 as an adjacent table to base table Gamma, along with the common key "A" between Gamma and Alpha. As shown in FIG. 2E, the name of base table Gamma is inserted in adjacent list 204 as an adjacent table to base table Beta, along with the common key "G" between Beta and Gamma. As shown in FIG. 2F, the name of base table Beta is inserted in adjacent list 204 as an adjacent table to base table Gamma, along with the common key "G" between Gamma and Beta. FIG. 2G shows a graphical representation of JoinGraph 200 of FIG. 2F. It is to be understood that JoinGraph 200 may comprise any structure that indicates the relationships shown in FIG. 2G.

Generating a JoinPathList

A JoinPathList is a data structure which is based on a plurality of joined base tables. A JoinPathList may be created for any group of base tables wherein each of the tables is directly or indirectly joined with every other table in the group. A JoinPathList may comprise an intermediate data structure or a relation-indicating data structure in some embodiments of the invention. The group of tables used to form a JoinPathList may comprise all of the base tables in a database, or some subset of the base tables in a database. Such a group of base tables is sometimes referred to as a "join sequence" (although the order of the base tables in a join sequence is not important). A JoinPathList also includes at least one virtual table. A virtual table is a table whose contents identify two or more base tables. A virtual table may be made up of the names of two or more base tables. A virtual table may be named for the base tables identified by the virtual table (although it is to be understood that different names could be assigned to virtual tables without departing from the spirit or scope of the invention). A JoinPathList may be used to identify joined rows of the base tables in the join sequence, as described below.

A JoinPathList may comprise a nodes list and an adjacent list. The nodes list lists all of the base tables of the join sequence as vertexes of the JoinPathList. The nodes list also lists as vertexes a number of virtual tables equal to one less than the number of base tables (i.e., if there are n base tables there are n-1 virtual tables, such that the nodes list contains a total of 2n-1 vertexes). The adjacent list may comprise, for each vertex in the nodes list, the name of an adjacent table, the names of a common table and a common key for that vertex (if any), and the names of an inherited table and an inherited key for that vertex (if any). The adjacent list for the last vertex may be empty. Not all vertexes necessarily have an inherited table and an inherited key.

Some base tables may include two or more different columns that reference each other. Such base tables are said to be in "self join". When a base table is in self join, the base table may be treated as two separate tables, with one base table indexed by one of the two columns, and the other base table indexed by the other of the two columns. When a name is given for a table in a query, that name may be used instead of the table's real name. Accordingly, a self join may be specified by a query which looks for correlations between two columns of the same table, in which case the two names for the table given in the query may be used.

A JoinPathList may be generated in three steps. First, a path is constructed from the JoinGraph, the path comprising an ordered list of all the base tables in the join sequence. Second, a nodes list and an adjacent list for the JoinPathList are generated. Third, the names of inherited tables and inherited keys are inserted into the adjacent list.

A path may be constructed for a join sequence of base tables $T_0 \ldots T_m$ of a JoinGraph, for example, by the following method:

1. Create 2 auxiliary data structures. The auxiliary data structures may comprise dynamic structures such as dynamic arrays, linked lists or dynamic collections, or alternatively may comprise static data structures (although if static data structures are used, the size of the static data structures must be selected to accomodate all of the base tables in the join sequence). In the illustrated example, the auxiliary data structures comprise two dynamic arrays named "QUEUE" and "PATH". However, it is to be understood that the names chosen for the auxiliary data structures do not affect the operation of the method. QUEUE may be referred to as a "first auxiliary data structure." PATH may be referred to as a "second auxiliary data structure."
2. Insert $T_0$ (which may be any arbitrarily selected table from the join sequence) into PATH.
3. Insert $T_0$ into QUEUE.
4. Designate the first element in QUEUE as $T_{Element}$.
5. For each adjacent table in the adjacent list of the JoinGraph for $T_{Element}$, if the adjacent table is one of $T_0 \ldots T_m$ and the adjacent table is not already contained in PATH:
   a. insert the name of the adjacent table into PATH; and,
   b. insert the name of the adjacent table into QUEUE.
6. Remove $T_{Element}$ from QUEUE.
7. Repeat steps 4-6 until QUEUE is empty.

Once QUEUE is empty after step 7 above, PATH contains an ordered list of the base tables in the join sequence, which may be used as a path for generating a JoinPathList, as described below. The ordered list of base tables may begin with any arbitrarily selected base table of the join sequence. The next base tables in the ordered list may be the base tables in direct join with the arbitrarily selected base table, followed by base tables which are separated from the arbitrarily selected base table by two direct joins, and so on.

After a path has been created, the path may be used to generate the nodes list and the adjacent list for the JoinPathList, for example, by the following method:

1. Insert all the names of the base tables from PATH as vertexes in the nodes list of the JoinPathList.
2. Create a buffer "BUF".
3. Insert the name of the first table from PATH into BUF.
4. Designate the next table in PATH as $T_i$.
5. Insert the contents of BUF ("$T_{[buf]}$") into the adjacent list as the adjacent table for $T_i$ in the JoinPathList.
6. Insert the name of $T_i$ into the adjacent list as the common table for $T_i$ in the JoinPathList, and insert a common key between $T_i$ and $T_{[buf]}$ into the adjacent list as the common key for $T_i$. The common key may comprise the key for the first table whose name is in $T_{[buf]}$ which is an adjacent table from the adjacent list for $T_i$ in the JoinGraph.
7. Insert the name of $T_i$ into the adjacent list as the adjacent table for $T_{[buf]}$ in the JoinPathList.
8. Insert the name of the first base table in $T_{[buf]}$ which has a common key with $T_i$ into the adjacent list as the common table for $T_{[buf]}$ in the JoinPathList, and insert the common key between $T_{[buf]}$ and $T_i$ into the adjacent list as the common key for $T_{[buf]}$.
9. Add the name of $T_i$ to $T_{[buf]}$.
10. Add the contents of $T_{[buf]}$ as a vertex in the nodes list of the JoinPathList.
11. Designate the next table in PATH as $T_i$ and repeat steps 5-10, until the last table in PATH has been processed.

Step 9 above results in the creation of a virtual table, which is added as a vertex in the nodes list of the JoinPathList in step 10. The first iteration of the above method results in a virtual table made up of the names of the first two base tables in PATH being added as a vertex in the nodes list of the JoinPathList. The last iteration of the above method results in a virtual table made up of the names of all of the base tables in PATH being added as a vertex in the nodes list of the JoinPathList.

After the nodes list and the adjacent list for the JoinPathList have been generated, the last vertex of the nodes list comprises a virtual table without any adjacent table, common table, or common key. At this point, one or more table and key pairs may optionally be inserted into the adjacent list as common tables and common keys for the last vertex before the inherited tables and keys are inserted. This step causes the index of joined rows which will eventually be created to be automatically sorted by <table, key> as it is created. This step is not necessary, since the index of joined rows could also be sorted after it is created.

The names of inherited tables and inherited keys may be inserted into the adjacent list for the JoinPathList, for example, by the following method:

1. Create a new structure "BUF2" with 2 fields: Table and Key
2. Designate the last table (which will be a virtual table) in the nodes list as $T_{[j]}$.
3. For each base table $T_k$ in $T_{[j]}$, if:
   any couple <Table,Key> in BUF2 contains $T_k$ in Table; and,
   the couple <Table,Key> containing $T_k$ is not already in the adjacent list (either as the common table and common key or the inherited table and inherited key) for $T_{[j]}$ in the JoinPathList, then
   insert the couple <Table,Key> containing $T_k$ in the adjacent list of the JoinPathList as an inherited table and inherited key for $T_{[j]}$.
4. If $T_{[j]}$ is not a base table then insert the common table and the common key for $T_{[j]}$ from the adjacent list of the JoinPathList as a new couple <Table,Key> in BUF2.
5. Designate the table preceding $T_{[j]}$ in the nodes list of the JoinPathList as $T_{[j]}$.

6. Repeat steps 3-5 until there is no preceding table from $T_{[i]}$ in the nodes list of the JoinPathList as $T_{[i]}$ (i.e., until the first table in the nodes list has been processed).

The methods described above may be carried out, for example, in a database system comprising a processor adapted to access a database containing the base tables in the join sequence. FIGS. 3A-C show example pseudo-code of an algorithm for generating a JoinPathList, and FIG. 3D shows example pseudo-code of an algorithm for determining a common table and key for two input tables which may be called by the algorithm of FIGS. 3A-C. In the pseudo-code of FIGS. 3A and 3D, "Link Item" is used to refer to base tables in the adjacent list of $T_{Element}$ in the JoinGraph. In the pseudo-code of FIG. 3C, "BUF2.Table" and "BUF2.Key" are used to refer to the contents of the fields Table and Key, respectively, in BUF2. The following paragraphs describe how the above methods could be applied to create a JoinPathList for the base tables Alpha, Beta and Gamma of FIGS. 1A-C and 2B-F.

Figure 4A:
FIGS. 4A-G illustrate steps for creating a path from the JoinGraph of FIG. 2F.
Figure 4B:
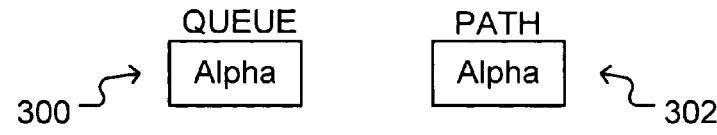

FIGS. 4A-G illustrate the creation of an example path for base tables Alpha, Beta and Gamma. JoinGraph 200 has been created. JoinGraph 200 identifies adjacent tables and shared keys for each base table. Subsequently, two dynamic arrays named "QUEUE" 300 and "PATH" 302 are created, as shown in FIG. 4A. The name of one of the base tables is inserted into both PATH 302 and QUEUE 300. In the illustrated example, table Alpha is selected to be the first table inserted in PATH 302 and QUEUE 300, as shown in FIG. 4B, but it is to be understood that any table could be selected.

Next, the following steps are repeated until QUEUE 300 is empty:

Locate the first table listed in QUEUE 300 in JoinGraph 200.

Figure 4C:
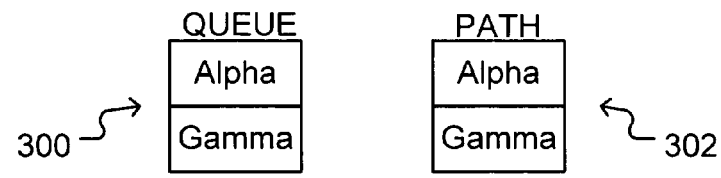
Figure 4D:
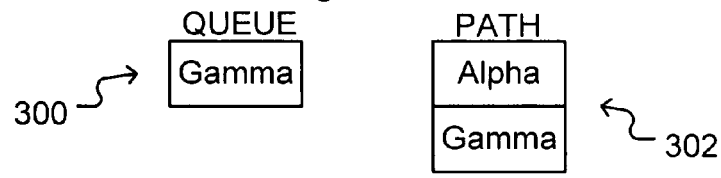
Figure 4E:
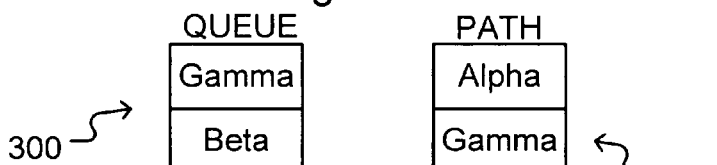

For each table which is adjacent to the first table of QUEUE 300, if PATH 302 does not contain the name of the adjacent table, insert the name of the adjacent table into both PATH 302 and QUEUE 300 (see FIGS. 4C and 4E).

Figure 4F:
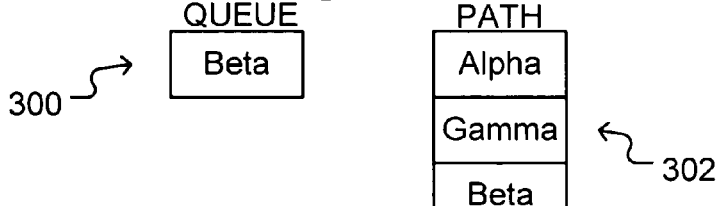
Figure 4G:
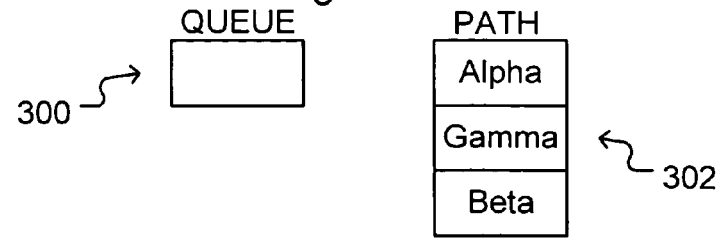

Remove the name of the first table from QUEUE 300 (see FIGS. 4D, 4F and 4G).

In FIG. 4E only Beta is inserted in PATH 302 and QUEUE 300, even though both Beta and Alpha are adjacent to Gamma, since Alpha is already in PATH 302.

Figure 5A:
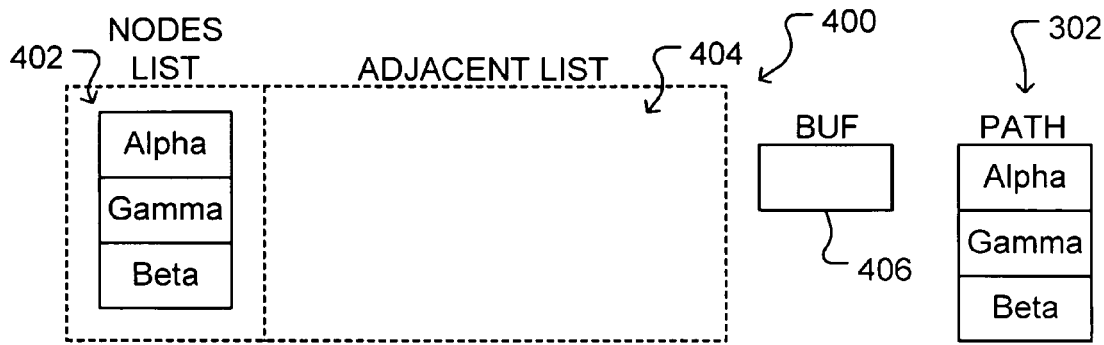
FIGS. 5A-N illustrate steps for creating a JoinPathList for the tables of FIGS. 1A-C based on the JoinGraph of FIG. 2F.
Figure 5B:
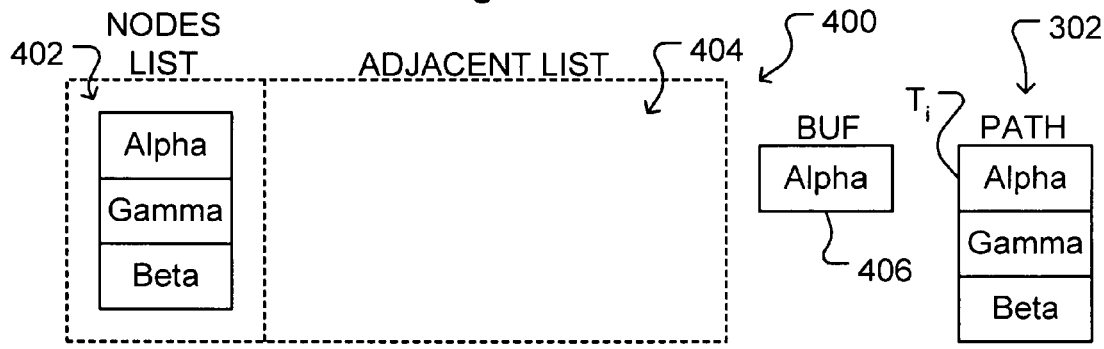
Figure 5C:
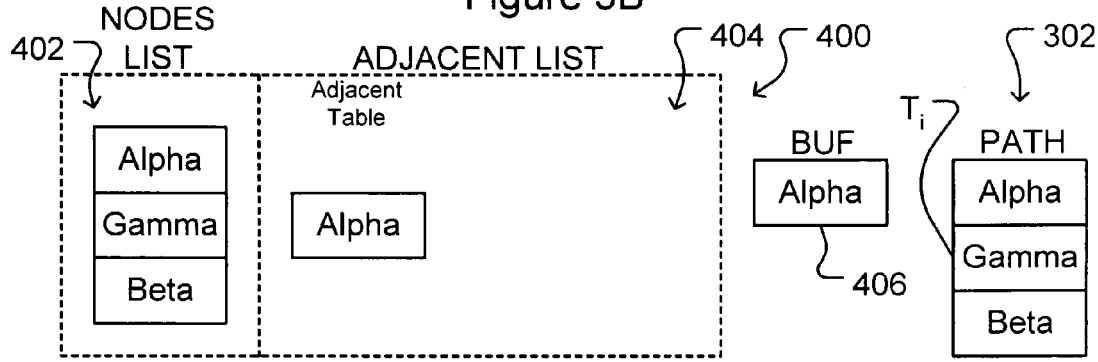
Figure 5D:
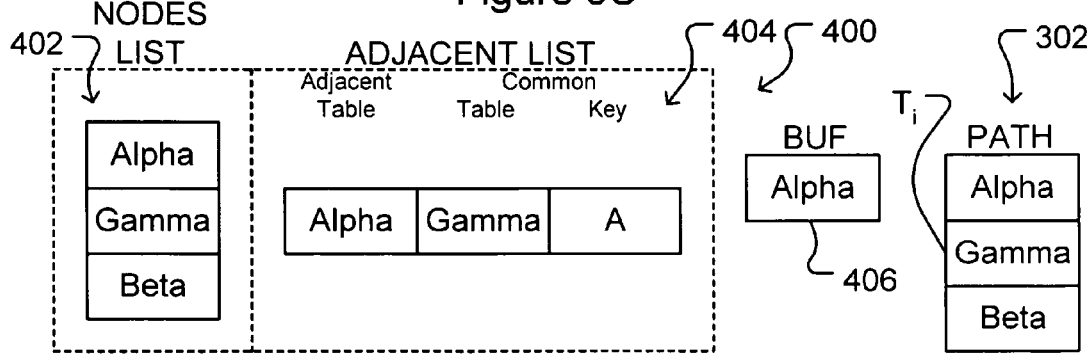
Figure 5E:
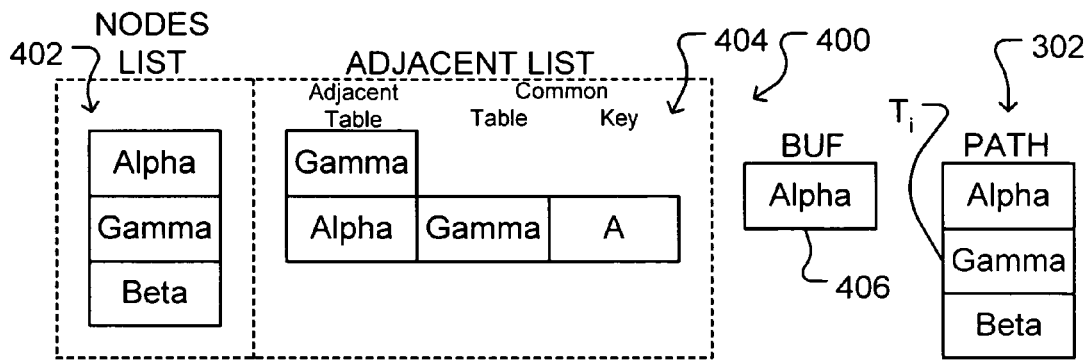
Figure 5F:
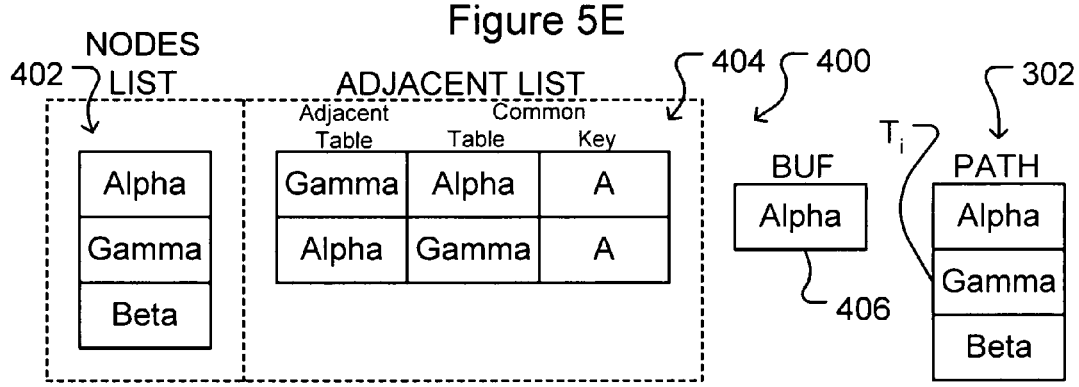
Figure 5G:
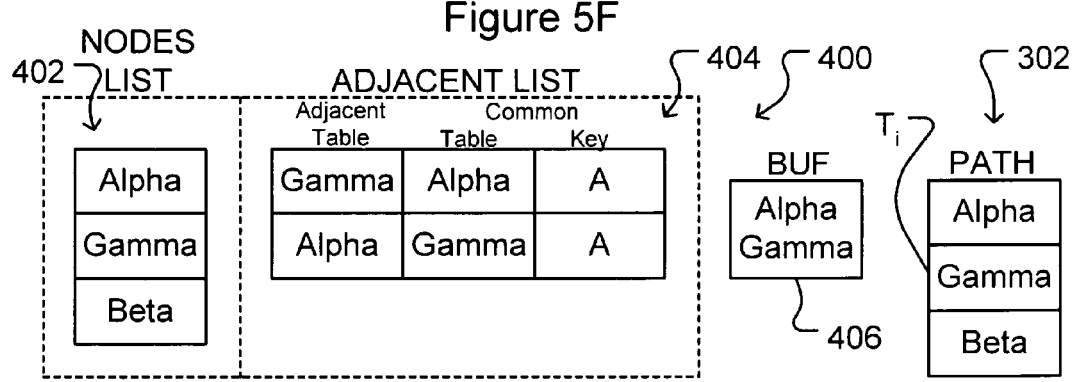
Figure 5H:
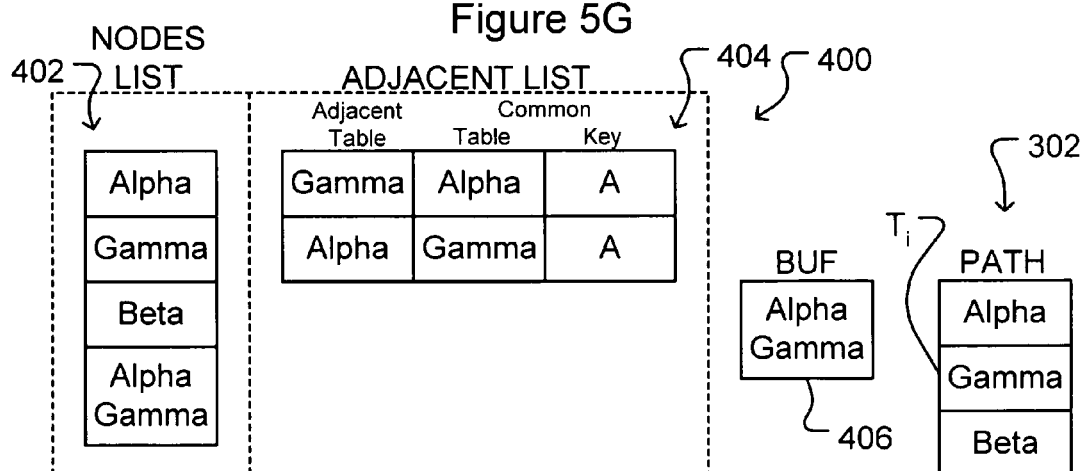
Figure 5I:
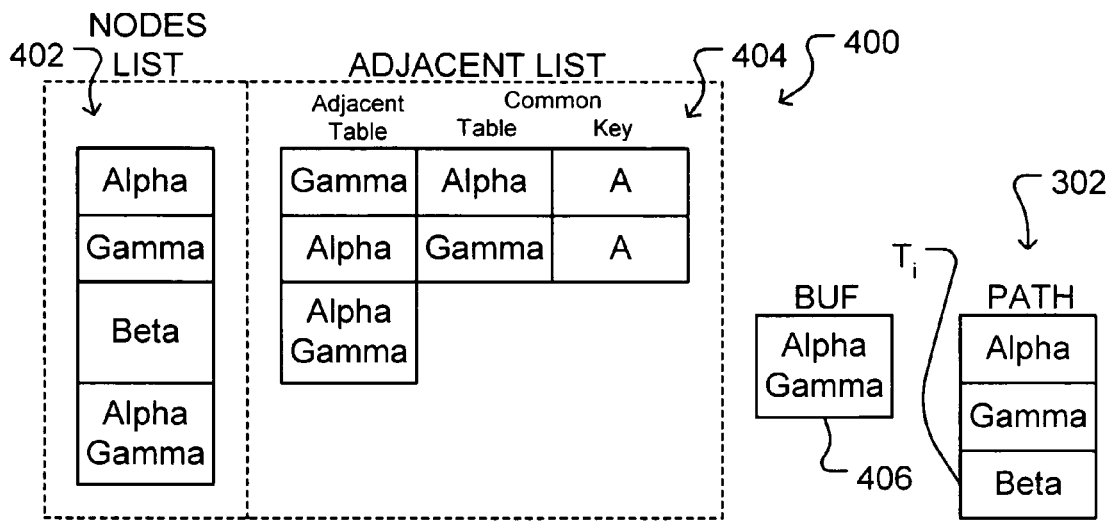
Figure 5J:
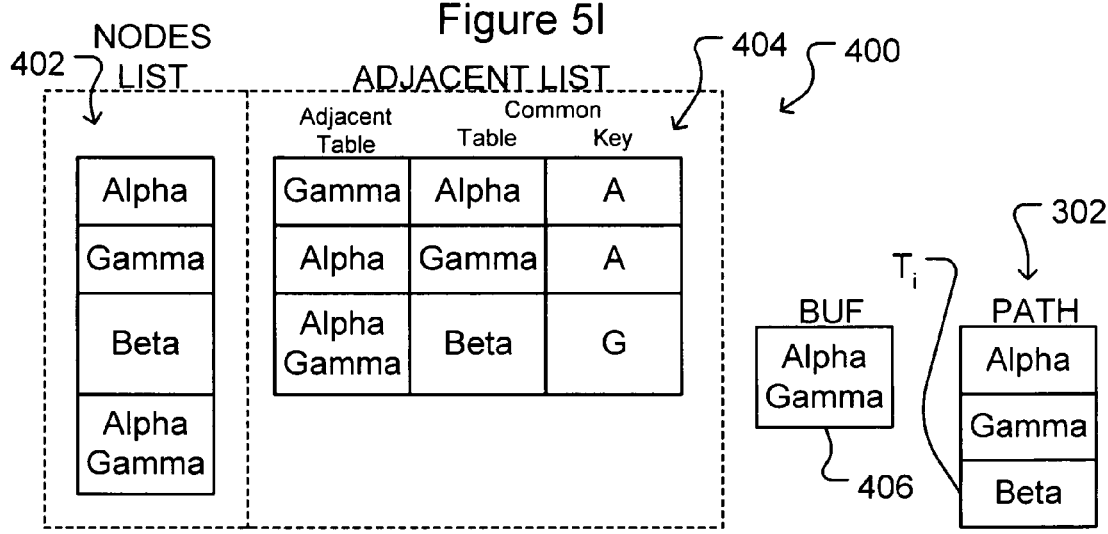
Figure 5K:
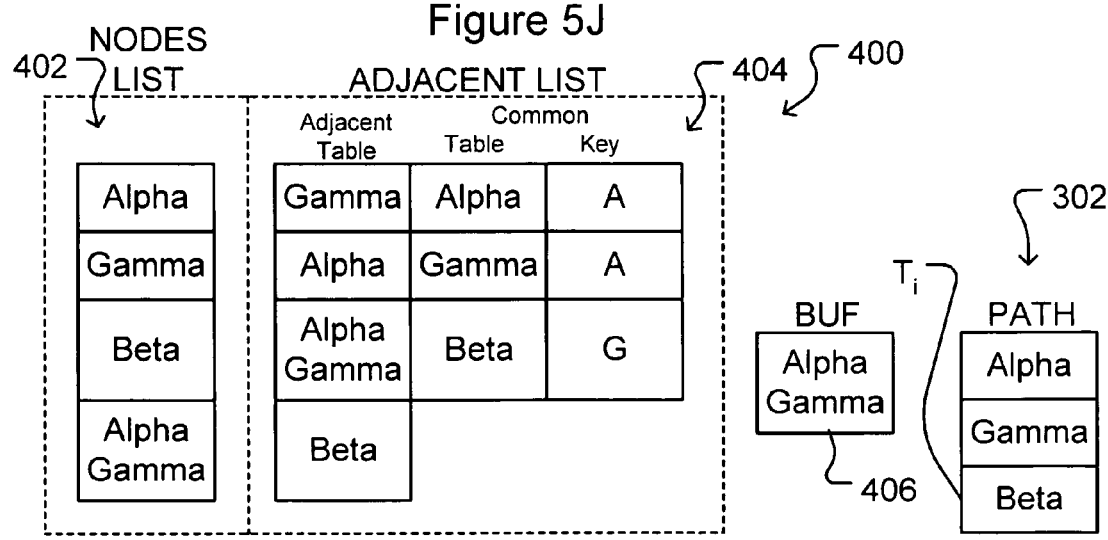
Figure 5L:
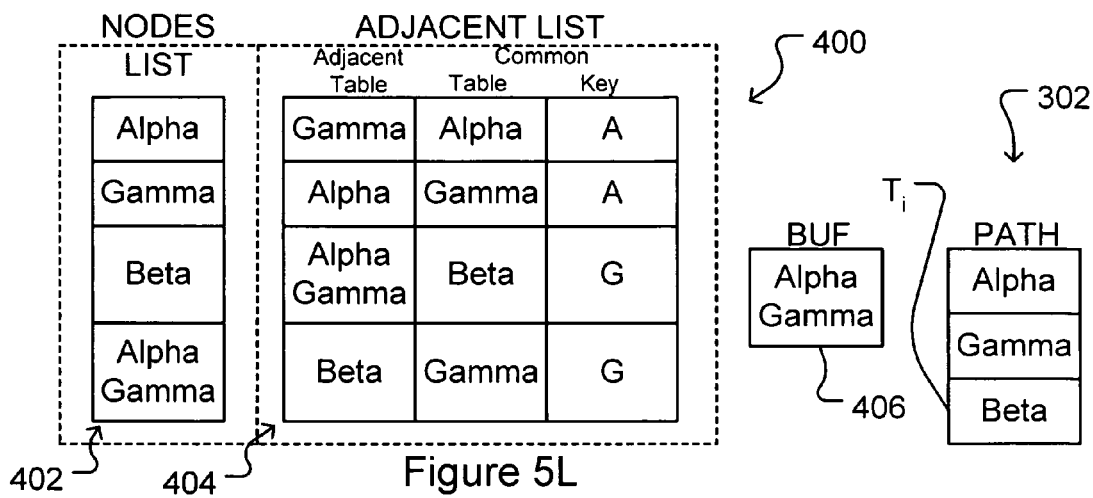
Figure 5M:
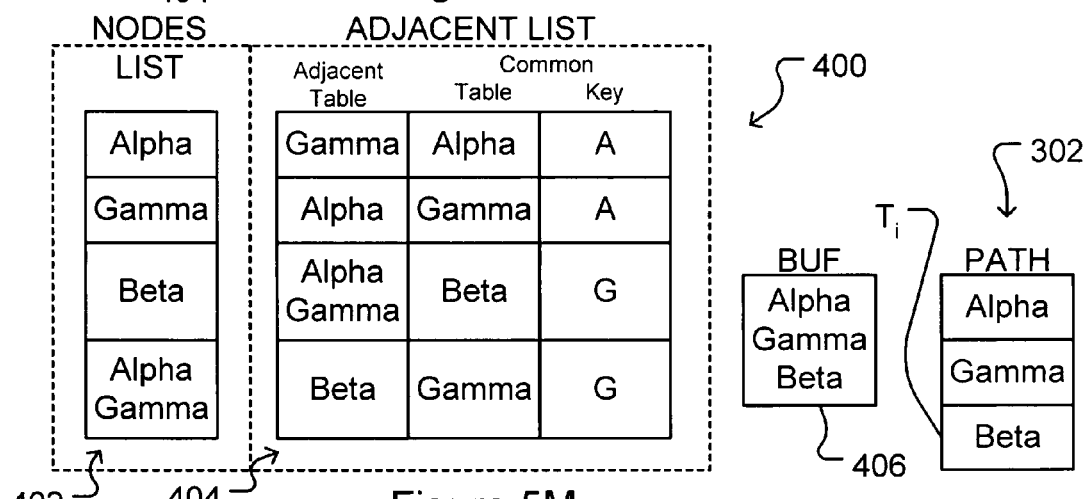
Figure 5N:
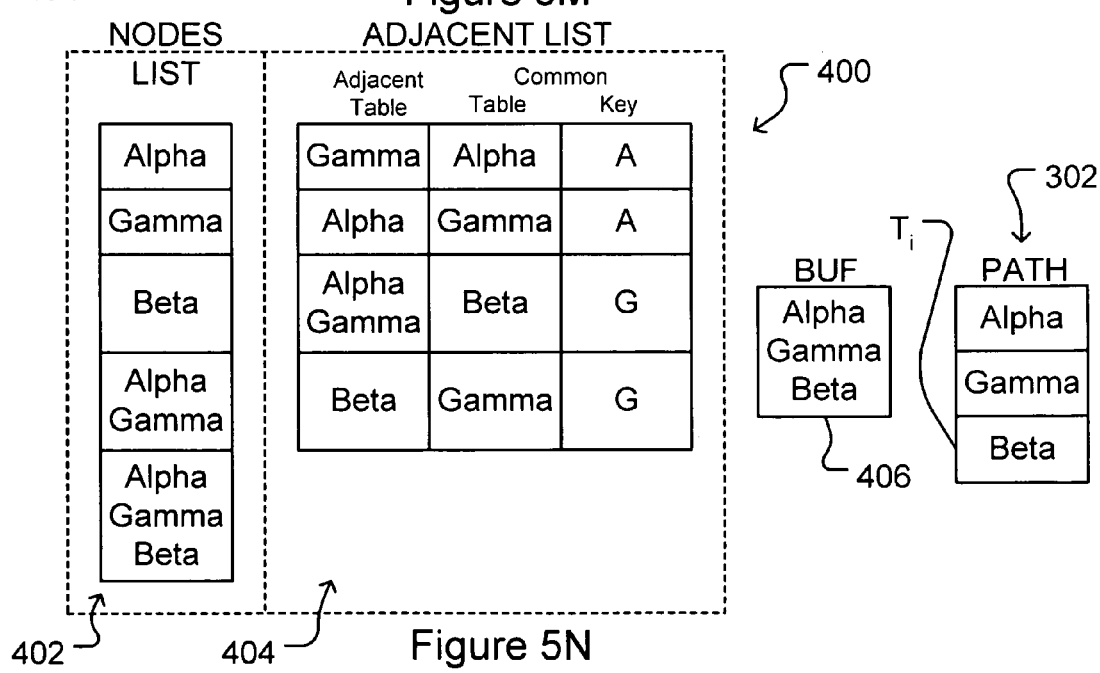

PATH 302 is used in generating a JoinPathList 400, as shown in FIGS. 5A-N. JoinPathList 400 comprises a nodes list 402 and an adjacent list 404. First, the names of the base tables in PATH 302 are inserted into nodes list 402 of Join-PathList 400, and a buffer named "BUF" 406 is created, as shown in FIG. 5A. Next, the name of the first table $T_i$ from PATH 302 is inserted in BUF 406, as shown in FIG. 5B.

After the name of the first table from PATH 302 is inserted in BUF 406, the next table $T_i$ in PATH 302 is identified, which is table Gamma in the illustrated example. Next, the name of the table in BUF 406 (Alpha), referred to as $T_{[buf]}$, is inserted as the adjacent table for $T_i$ (Gamma) in adjacent list 404, as shown in FIG. 5C. Then the name of $T_i$ (Gamma) is inserted in adjacent list 404 as the common table for $T_i$ (Gamma), and the common key ("A") between $T_i$ (Gamma) and $T_i$ (Alpha) is inserted in adjacent list 404 as the common key for $T_i$ (Gamma), as shown in FIG. 5D. Next, the name of $T_i$ (Gamma) is inserted as the adjacent table for $T_{[buf]}$ (Alpha) in adjacent list 404, as shown in FIG. 5E. Then the name of the first base table in $T_{[buf]}$ (Alpha) which has a common key with $T_i$ (Gamma) is inserted in adjacent list 404 as the common table for $T_{[buf]}$ and the common key ("A") between $T_{[buf]}$ (Alpha) and $T_i$ (Gamma) is inserted in adjacent list 404 as the common key for $T_{[buf]}$ (Alpha), as shown in FIG. 5F. Then the name of $T_i$ (Gamma) is added to BUF 406, as shown in FIG. 5G, and $T_{[buf]}$ (now Alpha Gamma) is added to nodes list 402 as shown in FIG. 5H.

Then the name of the next table $T_i$ in PATH 302 is identified, which is table Beta in the illustrated example. Next, the contents of $T_{[buf]}$ (Alpha Gamma) are inserted as the adjacent table for $T_i$ (Beta) in adjacent list 404, as shown in FIG. 5I. Then the name of $T_i$ (Beta) is inserted in adjacent list 404 as the common table for $T_i$ (Beta), and the common key ("G") between $T_i$ (Beta) and $T_{[buf]}$ (Alpha Gamma) is inserted in adjacent list 404 as the common key for $T_i$ (Beta), as shown in FIG. 5J. Since $T_{[buf]}$ (Alpha Gamma) is a virtual table, the common key is determined by checking the base tables in $T_{[buf]}$ (Alpha Gamma) one by one until a base table having a common key with $T_i$ (Beta) is located. The common key for $T_i$ (Beta) in adjacent list 404 may comprise one or more columns from the first base table listed in $T_{[buf]}$ (Alpha Gamma) that are also in $T_i$ (Beta).

Next, the name of $T_i$ (Beta) is inserted as the adjacent table for $T_{[buf]}$ (Alpha Gamma) in adjacent list 404, as shown in FIG. 5K. Then the first base table in $T_{[buf]}$ (Alpha Gamma) which has a common key with $T_i$ (Beta) is inserted in adjacent list 404 as the common table for $T_{[buf]}$ (Alpha Gamma), and the common key ("G") between $T_{[buf]}$ (Alpha Gamma) and $T_i$ (Beta) is inserted in adjacent list 404 as the common key for $T_{[buf]}$ (Alpha Gamma), as shown in FIG. 5L. Then the name of $T_i$ (Beta) is added to BUF 406, as shown in FIG. 5M, and the contents of $T_{[buf]}$ (now Alpha Gamma Beta) are added to nodes list 402 as shown in FIG. 5N.

Figure 6A:
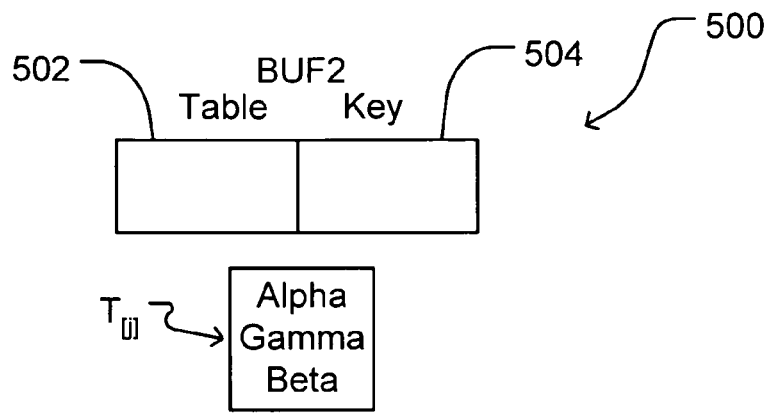
FIGS. 6A-G illustrate steps for adding inherited tables and keys to the JoinPathList of FIG. 5N.

After all of the remaining tables from PATH 302 have been processed as set out in the above paragraphs, BUF 406 is no longer needed and a new buffer, BUF2 500 is created having two fields Table 502 and Key 504, as shown in FIG. 6A. BUF2 500 is used to process each of the tables (both virtual and base tables) $T_{[j]}$ in nodes list 402 one by one, starting with the bottom table and moving upward, in order to insert the names of inherited tables and keys into adjacent list 404.

As shown in FIG. 6A, the first table from nodes list 402 selected as $T_{[j]}$ is the virtual table Alpha Gamma Beta. The base tables $T_k$ constituting $T_{[j]}$ (Alpha Gamma Beta) are taken one at a time, and compared with each of the rows of BUF2 500 to determine the inherited tables and keys for adjacent list 404. If Table 502 of a row of BUF2 500 contains the name of $T_k$, and Table 502 and Key 504 of that row are not the same as the common table and common key pair for $T_{[j]}$ (Alpha Gamma Beta) in adjacent list 404, then the names of Table 502 and Key 504 of that row are inserted into adjacent list 404 as an inherited table and inherited key of $T_{[j]}$ (Alpha Gamma Beta), provided they are not already there. Since BUF2 500 is initially empty, no inherited tables or keys are inserted for the virtual table Alpha Gamma Beta.

Figure 6B:
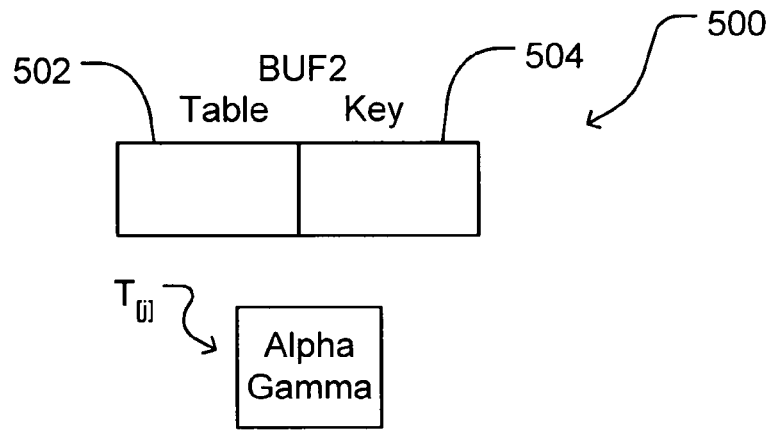

Next, if $T_{[j]}$ is not a base table, the names of the common table and key for $T_{[j]}$ in adjacent list 404 are inserted in Table 502 and Key 504 respectively of one row of BUF2 500. Since adjacent list 404 is empty for the virtual table Alpha Gamma Beta, BUF2 500 remains empty, and the next table up nodes list 402 becomes $T_{[j]}$ (Alpha Gamma), as shown in FIG. 6B.

Figure 6C:
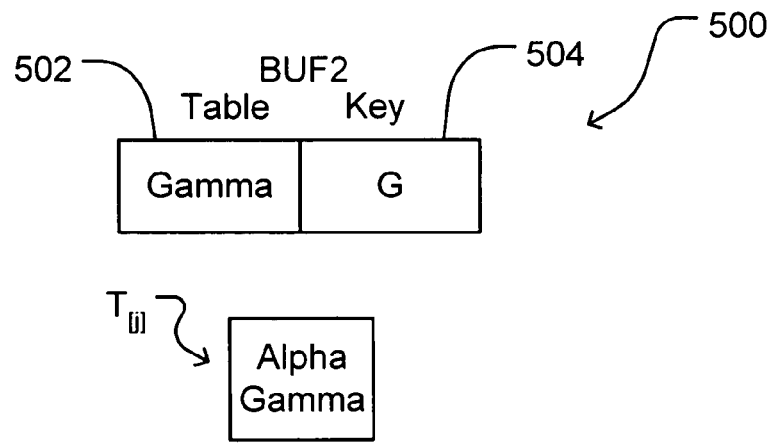

The above steps are now repeated with virtual table Alpha Gamma as $T_{[j]}$. BUF2 500 is still empty, so no inherited tables or inherited keys are inserted into adjacent list 404 for Alpha Gamma. However, adjacent list 404 does contain table Gamma and key "G" as the common table and common key for Alpha Gamma, so these are inserted into Table 502 and Key 504, respectively, of BUF2 500, as shown in FIG. 6C.

Figure 6D:
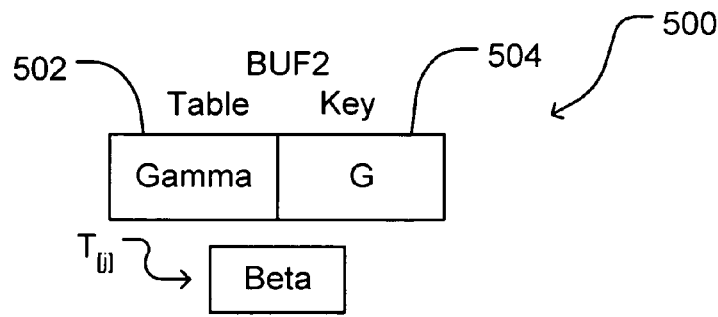

The above steps are now repeated with base table Beta as $T_{[j]}$, as shown in FIG. 6D. BUF2 500 is no longer empty, but Beta is not in Table 502 of BUF2 500, so no inherited tables or inherited keys are inserted into adjacent list 404 for Beta. Although Beta and "G" appear in adjacent list 404 for $T_{[j]}$ (Beta), they are not inserted into Table 502 and Key 504, of BUF2 500, since $T_{[j]}$ is a base table (Beta).

Figure 6E:
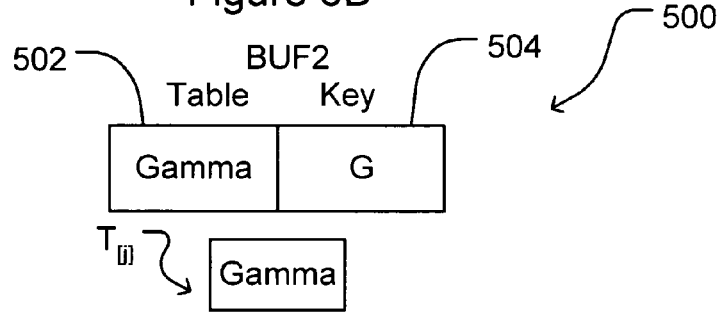
Figure 6F:
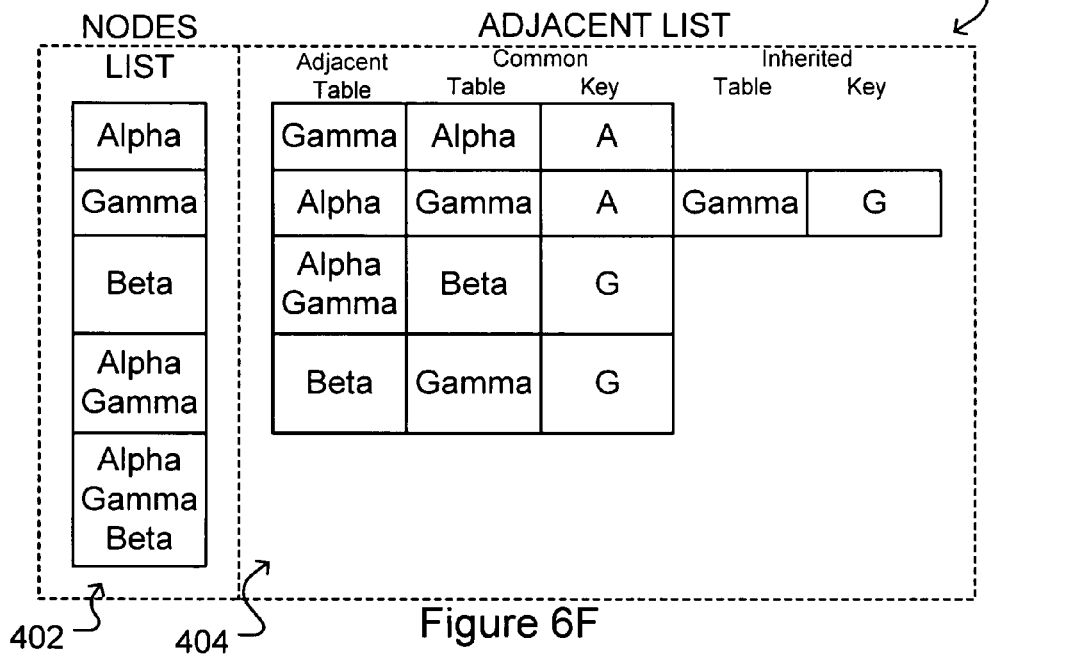

The above steps are now repeated with base table Gamma as $T_{[j]}$, as shown in FIG. 6E. Since $T_{[j]}$ (Gamma) is in Table 502 in the first row of BUF2 500, and Table 502 and Key 504 of that row are not the same as the common table and key pair for $T_{[j]}$ (Gamma) in adjacent list 404, Table 502 and Key 504 of that row are inserted as an inherited table and key for $T_{[j]}$ in adjacent list 404, as shown in FIG. 6F. Although Gamma and "A" appear in adjacent list 404 for $T_{[j]}$ (Gamma), they are not inserted into Table 502 and Key 504, of BUF2 500, since $T_{[j]}$ (Gamma) is a base table.

Figure 6G:
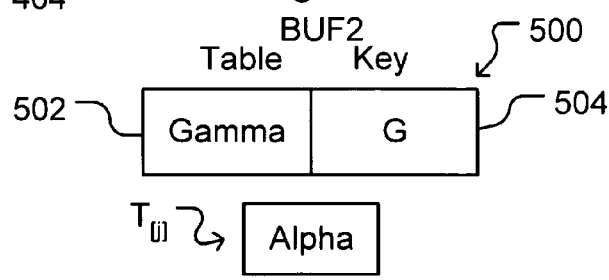

The above steps are now repeated with base table Alpha as $T_{[j]}$, as shown in FIG. 6G. Alpha is not in Table 502 of BUF2 500, so no inherited tables or inherited keys are inserted into adjacent list 404 for Alpha. Although Alpha and "A" appear in adjacent list 404 for $T_{[j]}$ (Alpha), they are not inserted into Table 502 and Key 504, of BUF2 500, since $T_{[j]}$ (Alpha) is a base table.

The methods described above may be applied to produce a JoinPathList for any number of tables in join. The JoinPathList may be used to process the rows of the joined tables to generate indexing data structures indicating the relationships between joined rows, as described below.

Creating B+Trees

Once a JoinPathList has been created for a join sequence of base tables, an indexing data structure is created for each vertex of the nodes list. The resulting series of indexing data structures is referred to as a "$B^{Join}$Tree™". $B^{Join}$Tree is a trademark coined by the inventor to refer to a join identifying data structure comprising a series of indexing data structures, as described herein. The indexing data structure created for the last virtual table of the nodes list comprises a plurality of sets of data pointers. Each data pointer comprises information identifying a row of a base table. The data pointers may comprise row numbers for the base tables, or may comprise any other information from which the rows may be identified. Each set of data pointers points to rows from tables in join together. The indexing data structures preferably comprise B+Trees, and the following discussion and examples refer to the indexing data structures as B+Trees. However, it is to be understood that the indexing data structures may comprise any suitable data structure, such as, for example any kind of primary or secondary indexes.

Each B+Tree may be designated by the name of the $B^{Join}$-Tree, followed by an indication of the vertex of the nodes list to which it relates. For example, if a join sequence has n base tables $T_0 \ldots T_{n-1}$, the B+Trees may be designated as B+Tree$(T_0) \ldots$ B+Tree$(T_{2n-2})$, where B+Tree$(T_0) \ldots$ B+Tree$(T_{n-1})$ relate to the base tables of the JoinPathList, and B+Tree$(T_n) \ldots$ B+Tree$(T_{2n-2})$ relate to the virtual tables of the JoinPathList. FIG. 7A shows example pseudo-code of an algorithm for generating a $B^{Join}$Tree.

Each B+Tree of the $B^{Join}$Tree has a number of data pointers equal to the number of base tables in the vertex to which it relates. For example, the B+Trees relating to the vertexes containing the names of base tables will each have one data pointer, and the B+Trees relating to the vertexes containing the names of virtual tables will each have two or more data pointers. Each B+Tree may also have a Key defined by the pair <common table, common key> for the vertex to which it relates, and an InheritedKey defined by the pair <inherited table, inherited key> for the vertex to which it relates. The B+Trees for base tables and virtual tables which do not have any inherited table or inherited key in the JoinPathList do not have an InheritedKey.

Inserting Rows

Once the $B^{Join}$Tree has been created, data pointers, keys and inherited keys from the rows of the base tables of the join sequence are inserted into the $B^{Join}$Tree. In order to insert the data pointer, key and inherited key from a designated row of a designated base table, first the designated base table is located in the JoinPathList and the definitions of the key and inherited key are obtained (for some base tables, there is no inherited key). Next, the designated row of the designated base table is scanned to obtain the data pointer, key and inherited key (if one exists), which are used as input parameters in a recursive function for inserting information into the $B^{Join}$Tree.

The recursive function adds the data pointer, key and inherited key (if one exists) of the designated row to the B+Tree for the designated base table and then searches for the key of the designated row in the B+Tree for the adjacent table for the designated base table. If the key is found in the B+Tree for the adjacent table, the function obtains the data pointer, key and inherited key (if one exists) from the B+Tree, and locates the virtual table which comprises a combination of the names of the designated base table and its adjacent table. Then, the recursive function identifies the datapointer(s), key and inherited key (if one exists) for the B+Tree of that virtual table, calls itself with those parameters, and when it returns after the call is complete, searches again for another occurrence of the key of the designated row in the B+Tree for the adjacent table for the designated base table. As described further below, when the recursive function calls itself, depending on the table used in the call, the recursive function sometimes inserts only data pointers and keys, into the B+Tree for the table used in the call, and sometimes only data pointers. Finally, after the recursive function has failed to find the key, insertion of the designated row is complete.

In one embodiment of the invention, a row $R_m$ from table $T_{[i]}$ may be inserted, for example, by the following method:
1. Locate the entry of $T_{[i]}$ in the JoinPathList.
2. From the adjacent list for $T_{[i]}$, locate the definition of the key and inherited key.
3. From $R_m$, get the data elements from the columns constituting the key ("Key$_i$") and the inherited key ("InheritedKey$_i$").
4. Call the recursive function AddJoinKey, using $T_{[i]}$, the data pointer for row $R_m$ ("DP$_i$"), Key$_i$ and InheritedKey$_i$ as the input parameters.

The recursive function AddJoinKey($T_{[i]}$, DP$_i$, Key$_i$, InheritedKey$_i$) may, for example, be executed as follows:
1. Add DP$_i$, Key$_i$ and InheritedKey$_i$ to B+Tree($T_{[i]}$)
2. Locate the entry of $T_{[i]}$ in the JoinPathList.
3. From the adjacent list for $T_{[i]}$, locate the definition of the adjacent table ("$T_{[k]}$").
4. Locate the entry of $T_{[k]}$ in the JoinPathList.
5. Search for Key$_i$ in B+Tree($T_{[k]}$), and if Key$_i$ is found in B+Tree($T_{[k]}$):
   (a) From B+Tree($T_{[k]}$), get DP$_k$, Key$_k$ and InheritedKey$_k$;
   (b) Locate the entry of $T_{[ik]}$ in the JoinPathList ($T_{[ik]}$ refers to the virtual table made up of $T_{[i]}$ and $T_{[k]}$);
   (c) From the adjacent list for $T_{[ik]}$, locate the definition of Key$_{ik}$ and InheritedKey$_{ik}$;
   (d) From Key$_i$, InheritedKey$_i$, Key$_k$ and InheritedKey$_k$, get Key$_{ik}$ and InheritedKey$_{ik}$ (i.e., select those data elements which match the definition of Key$_{ik}$ and InheritedKey$_{ik}$);

(e) Call AddJoinKey with $T_{[ik]}$, $DP_{ik}$ (i.e., both $DP_i$ and $DP_k$) $Key_{ik}$ and $InheritedKey_{ik}$ as the input parameters $T_{[i]}$, $DP_i$, $Key_i$ and $InheritedKey_i$, respectively, while preserving the previous values of i, k and ik for use when the called AddJoinKey returns (the previous values of i, k, and ik may be stored, for example, in a stack); and, (f) When the called AddJoinKey returns, search for another occurrence of $Key_i$ in $B^+Tree(T_{[k]})$:

(i) if another occurrence of $Key_i$ is found in $B^+Tree(T_{[k]})$, return to step (a) above; and, (ii) if not, return to the method which called AddJoinKey (which could be AddJoinKey itself, or the insertion method described above).

FIGS. 7B and 7C show example pseudo-code of an algorithm for inserting information from rows of tables, and a recursive algorithm called by the insertion algorithm, respectively.

The insertion method and recursive algorithm described above may be used to update the $B^{Join}$Tree when a new row is added to one of the base tables in the join sequence. The insertion method may be automatically triggered by insertion of a new row into one of the base tables by, for example, a database management system.

The operation of the above described example insertion method and recursive function are described in greater detail below with reference to an example database.

Deleting Rows

When a row of one of the base tables is to be deleted, the $B^{Join}$Tree must be modified to reflect the deletion. Data from a row $R_m$ from table $T_{[i]}$ may be deleted from the $B^{Join}$Tree, for example by the following method:

1. Locate the entry of $T_{[i]}$ in the JoinPathList.
2. From the adjacent list for $T_{[i]}$, locate the definition of the key and inherited key.
3. From $R_m$, get the data elements from the columns constituting the key ("$Key_i$") and the inherited key ("$InheritedKey_i$").
4. Call the recursive function DelJoinKey, using $T_{[i]}$, the data pointer for row $R_m$ ("$DP_i$"), $Key_i$ and $InheritedKey_i$ as the input parameters.

The recursive function DelJoinKey($T_{[i]}$, $DP_i$, $Key_i$, $InheritedKey_i$) may, for example, be executed as follows:

1. Delete $DP_i$, $Key_i$ and $InheritedKey_i$ from $B^+Tree(T_{[i]})$
2. Locate the entry of $T_{[i]}$ in the JoinPathList.
3. From the adjacent list for $T_{[i]}$, locate the definition of the adjacent table ("$T_{[k]}$").
4. Locate the entry of $T_{[k]}$ in the JoinPathList.
5. Search for $Key_i$ in $B^+Tree(T_{[k]})$, and if $Key_i$ is found in $B^+Tree(T_{[k]})$:

(a) From $B^+Tree(T_{[k]})$, get $DP_k$, $Key_k$ and $InheritedKey_k$;

(b) Locate the entry of $T_{[ik]}$ in the JoinPathList ($T_{[ik]}$ refers to the virtual table made up of $T_{[i]}$ and $T_{[k]}$);

(c) From the adjacent list for $T_{[ik]}$, locate the definition of $Key_{ik}$ and $InheritedKey_{ik}$;

(d) From $Key_i$, $InheritedKey_i$, $Key_k$ and $InheritedKey_k$, get $Key_{ik}$ and $InheritedKey_{ik}$ (i.e., select those data elements which match the definition of $Key_{ik}$ and $InheritedKey_{ik}$);

(e) Call DelJoinKey with $T_{[ik]}$, $DP_{ik}$ (i.e., both $DP_i$ and $DP_k$) $Key_{ik}$ and $InheritedKey_{ik}$ as $T_{[i]}$, $DP_i$, $Key_i$ and $InheritedKey_i$, respectively, while preserving the values of i, k and ik for use when the called DelJoinKey returns; and, (f) When the called DelJoinKey returns, search for another occurrence of $Key_i$ in $B^+Tree(T_{[k]})$:

(i) if another occurrence of $Key_i$ is found in $B^+Tree(T_{[k]})$, return to step (a) above; and, (ii) if not, return to the method which called DelJoinKey (which could be DelJoinKey itself, or the deletion method described above).

FIGS. 7D and 7E show example pseudo-code of an algorithm for deleting information from rows of tables, and a recursive algorithm called by the deletion algorithm, respectively.

Example Database

Figure 8:
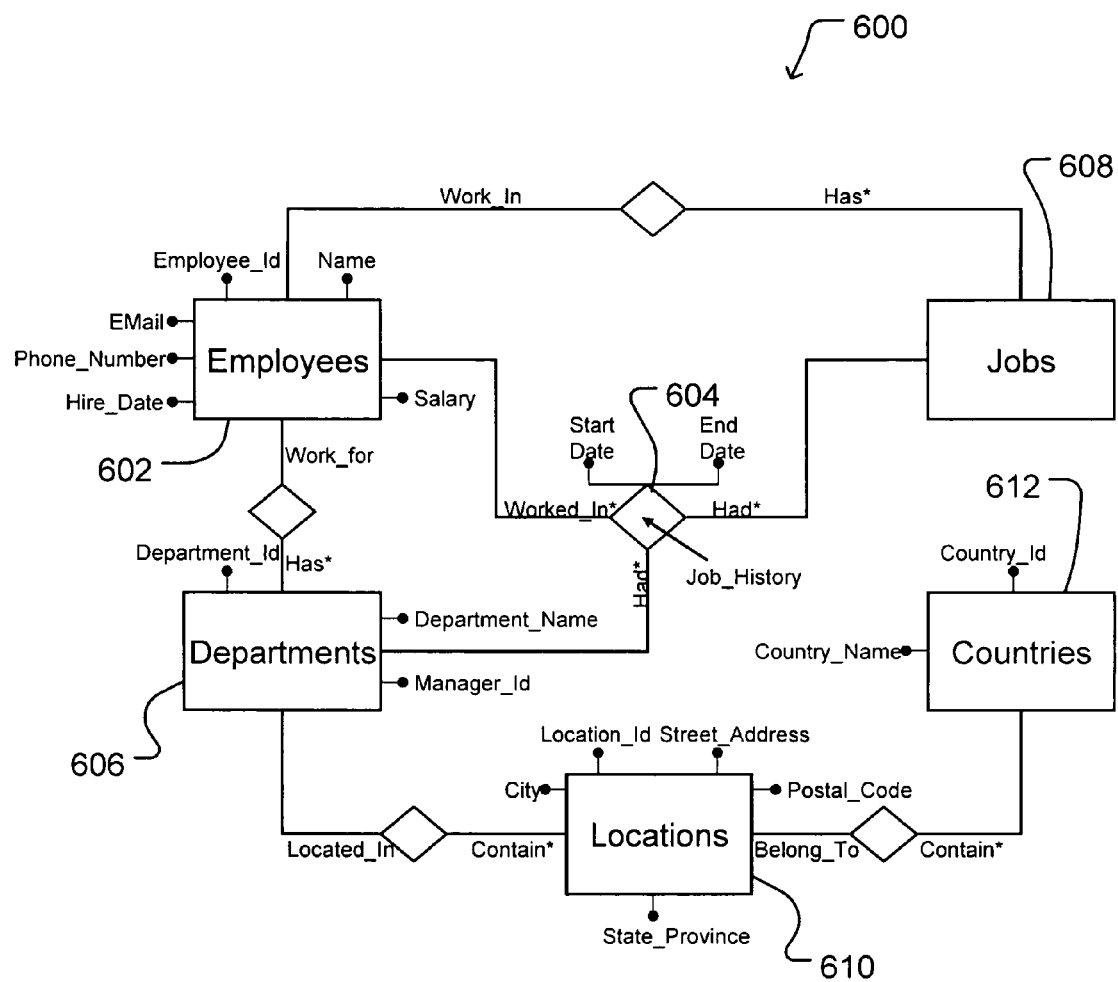
FIG. 8 shows an example relationship schema comprising a plurality of base tables.

FIG. 8 shows a relationship schema of an example database 600 which is used to demonstrate how the above method may be used to generate an index which identifies joined rows. Database 600 comprises six base tables: Employees 602, Job_History 604, Departments 606, Jobs 608, Locations 610 and Countries 612.

Base tables 602-612 are shown filled with sample data in FIGS. 9A-F. Each table comprises a plurality of rows, which are identified by data pointers shown adjacent the left sides of tables 602-612 in FIGS. 9A-F. Each data pointer comprises information identifying a row of a base table. The data pointers may comprise row numbers for the base tables, or may comprise any other information from which the rows may be identified. Each row contains data elements stored in a plurality of columns shown along the tops of tables 602-612 in FIGS. 9A-F.

Figure 9G:
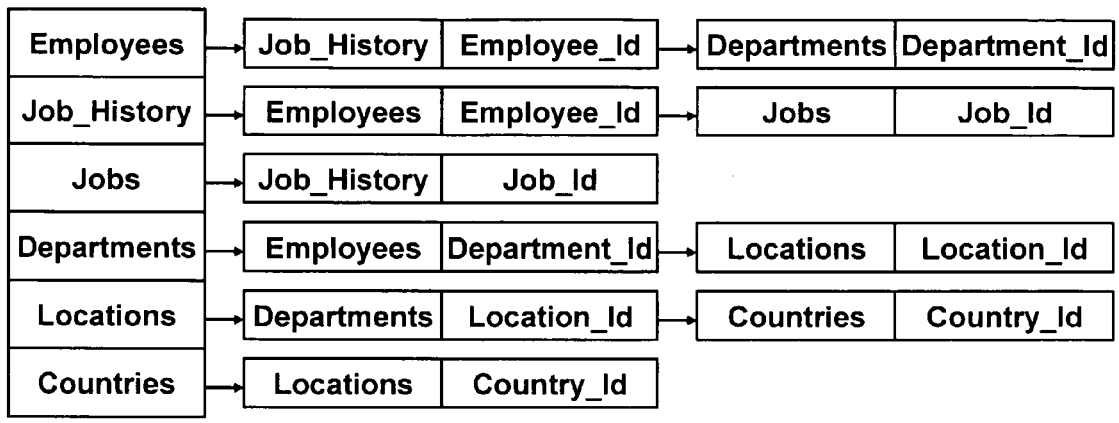
FIG. 9G shows a JoinGraph for the base tables of FIGS. 9A-F.
Figure 9H:
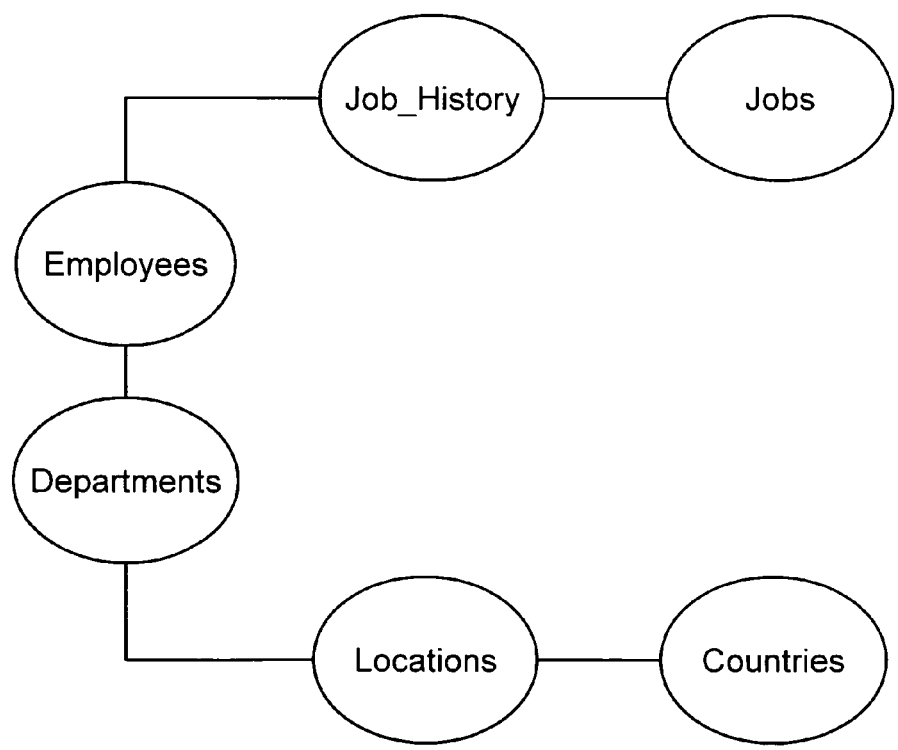
FIG. 9H is a graphical representation of the JoinGraph of FIG. 9G.
Figure 9I:
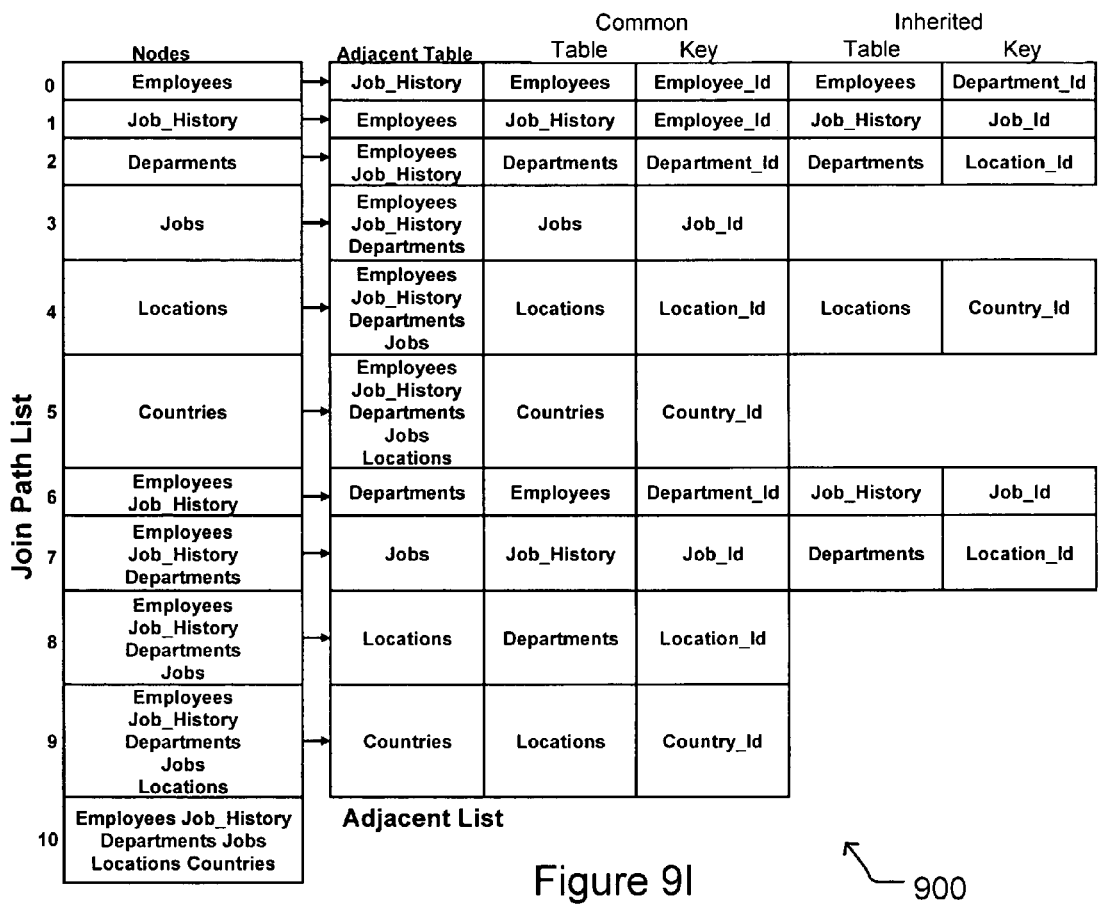
FIG. 9I shows a JoinPathList for the base tables of FIGS. 9A-F.

FIG. 9G shows a JoinGraph 800 for tables 602-612 in FIGS. 9A-F, which has been generated by the method described above under the heading "Generating a JoinGraph." FIG. 9H is a graphical representation of JoinGraph 800 of FIG. 9G. FIG. 9I shows a JoinPathList 900 for tables 602-612 in FIGS. 9A-F, which has been generated by the method described above under the heading "Generating a JoinPathList."

JoinPathList 900 has eleven vertexes in the nodes list, so eleven $B^+$Trees are created to form the $B^{Join}$Tree for tables 602-612. Each of the eleven $B^+$Trees are referred to as $B^+$Tree $(T_{[i]})$, where $T_{[i]}$ refers to the $i^{th}$ table in the nodes list of JoinPathList 900.

FIGS. 10A-C illustrate the steps involved in inserting the data pointer and data elements from the first row ("$R_{m=0}$") of table Employees 602 ("$T_{[i=0]}$") into the $B^{Join}$Tree. It should be noted that the order of insertion of rows from the base tables is not important. First, $T_{[0]}$ is located in JoinPathList 900, and the definitions of $Key_0$ and $InheritedKey_0$ are identified, as shown in FIG. 10A. Next, the data elements for $Key_0$ and $InheritedKey_0$ are obtained from $R_0$, as shown in FIG. 10B. Then the recursive function AddJoinKey($T_{[0]}$, $DP_0$, $Key_0$, $InheritedKey_0$) is called, and $DP_0$, $Key_0$ and $InheritedKey_0$ are inserted into $B^+Tree(T_{[0]})$, as shown in FIG. 10C.

Next, the adjacent table $T_{[k=1]}$ (Job_History) for $T_{[0]}$ is identified from JoinPathList 900, and $Key_0$ is searched for in $B^+Tree(T_{[1]})$. Since no other rows have been inserted yet, $B^+Tree(T_{[1]})$ is still empty, the recursive function AddJoinKey $(T_{[0]}, DP_0, Key_0, InheritedKey_0)$ ends, and insertion of the first row of table Employees 602 is complete.

FIGS. 11A-E illustrate the steps involved in inserting the data pointer and data elements from the first row ("$R_{m=0}$") of table Job_History 604 ("$T_{[i=1]}$") into the $B^{Join}$Tree. First, $T_{[1]}$ is located in JoinPathList 900, and the definitions of $Key_1$ and $InheritedKey_1$ are identified, as shown in FIG. 11A. Next, the data elements for $Key_1$ and $InheritedKey_1$ are obtained from $R_0$, as shown in FIG. 11B. Then the recursive function AddJoinKey($T_{[1]}$, $DP_1$, $Key_1$, $InheritedKey_1$) is called, and $DP_1$, $Key_1$ and $InheritedKey_1$ are inserted into $B^+Tree(T_{[1]})$, as shown in FIG. 11C.

Next, the adjacent table $T_{[k=0]}$ (Employees) for $T_{[1]}$ is identified from JoinPathList 900, and $Key_1$ is searched for in $B^+Tree(T_{[0]})$. Since the value of $Key_1$ is found in $B^+Tree$ ($T_{[0]}$), as shown in FIG. 10C, $DP_0$, $Key_0$ and $InheritedKey_0$ are obtained from $B^+Tree(T_{[0]})$. Next, table $T_{[ik=6]}$ (Employees Job_History) is located in JoinPathList 900, and the definitions of $Key_6$ and $InheritedKey_6$ are identified, as shown in FIG. 11D. Then, the data elements from $Key_1$, $InheritedKey_1$, $Key_0$ and $InheritedKey_0$ which fit the definitions of $Key_6$ and $InheritedKey_6$ are identified, along with $DP_6$, which comprises both $DP_1$ and $DP_0$ (i.e., $DP_6$ comprises information identifying both the row identified by $DP_1$ and the row identified by $DP_0$). Then, the recursive function $AddJoinKey(T_{[6]}, DP_6, Key_6, InheritedKey_6)$ is called, and $DP_6$, $Key_6$ and $InheritedKey_6$ are inserted into $B^+Tree(T_{[6]})$ as shown in FIG. 11E.

Next, the adjacent table $T_{[k=2]}$ (Departments) for $T_{[6]}$ is identified from JoinPathList 900, and $Key_6$ is searched for in $B^+Tree(T_{[2]})$. Since $B^+Tree(T_{[2]})$ is still empty, the recursive function $AddJoinKey(T_{[6]}, DP_6, Key_6, InheritedKey_6)$ ends and returns to complete $AddJoinKey(T_{[1]}, DP_1, Key_1, InheritedKey_1)$, where another occurrence of $Key_1$ is searched for in $B^+Tree(T_{[0]})$. Since another occurrence of $Key_1$ is not found in $B^+Tree(T_{[0]})$, $AddJoinKey(T_{[1]}, DP_1, Key_1, InheritedKey_1)$ ends, and insertion of the first row of table Job_History 604 is complete.

FIGS. 12A-C illustrate the steps involved in inserting the data pointer and data elements from the first row ("$R_{m=0}$") of table Locations 610 ("$T_{[i=4]}$") into the $B^{Join}Tree$. First, $T_{[4]}$ is located in JoinPathList 900, and the definitions of $Key_4$ and $InheritedKey_4$ are identified, as shown in FIG. 12A. Next, the data elements for $Key_4$ and $InheritedKey_4$ are obtained from $R_0$, as shown in FIG. 12B. Then, the recursive function $AddJoinKey(T_{[4]}, DP_4, Key_4, InheritedKey_4)$ is called, and $DP_4$, $Key_4$ and $InheritedKey_4$ are inserted into $B^+Tree(T_{[4]})$, as shown in FIG. 12C.

Next, the adjacent table $T_{[k=8]}$ (Employees Job_History Departments Jobs) for $T_{[4]}$ is identified from JoinPathList 900, and $Key_4$ is searched for in $B^+Tree(T_{[8]})$. Since $B^+Tree(T_{[8]})$ is still empty, the recursive function $AddJoinKey(T_{[4]}, DP_4, Key_4, InheritedKey_4)$ ends, and insertion of the first row of table Locations 610 is complete.

FIGS. 13A-E illustrate the steps involved in inserting the data pointer and data elements from the first row ("$R_{m=0}$") of table Departments 606 ("$T_{[i=2]}$") into the $B^{Join}Tree$. First, $T_{[2]}$ is located in JoinPathList 900, and the definitions of $Key_2$ and $InheritedKey_2$ are identified, as shown in FIG. 13A. Next, the data elements for $Key_2$ and $InheritedKey_2$ are obtained from $R_0$, as shown in FIG. 13B. Then, the recursive function $AddJoinKey(T_{[2]}, DP_2, Key_2, InheritedKey_2)$ is called, and $DP_2$, $Key_2$ and $InheritedKey_2$ are inserted into $B^+Tree(T_{[2]})$, as shown in FIG. 13C.

Next, the adjacent table $T_{[k=6]}$ (Employees Job_History) for $T_{[2]}$ is identified from JoinPathList 900, and $Key_2$ is searched for in $B^+Tree(T_{[6]})$. Since the value of $Key_2$ ("FIN") is found in $B^+Tree(T_{[6]})$, as shown in FIG. 11E, $DP_6$, $Key_6$ and $InheritedKey_6$ are obtained from $B^+Tree(T_{[6]})$. Next, table $T_{[ik=7]}$ (Employees Job_History Departments) is located in JoinPathList 900, and the definitions of $Key_7$ and $InheritedKey_7$ are identified, as shown in FIG. 13D. Then, the data elements from $Key_2$, $InheritedKey_2$, $Key_6$ and $InheritedKey_6$ which fit the definitions of $Key_7$ and $InheritedKey_7$ are identified, along with $DP_7$, which comprises both $DP_2$ and $DP_6$. Then, the recursive function $AddJoinKey(T_{[7]}, DP_7, Key_7, InheritedKey_7)$ is called, and $DP_7$, $Key_7$, $InheritedKey_7$ are inserted into $B^+Tree(T_{[7]})$ as shown in FIG. 13E.

Next, the adjacent table $T_{[k=3]}$ (Jobs) for $T_{[7]}$ is identified from JoinPathList 900, and $Key_7$ is searched for in $B^+Tree(T_{[3]})$. Since $B^+Tree(T_{[3]})$ is still empty, the recursive function $AddJoinKey(T_{[7]}, DP_7, Key_7, InheritedKey_7)$ ends and returns to complete $AddJoinKey(T_{[2]}, DP_2, Key_2, InheritedKey_2)$, where another occurrence of $Key_2$ is searched for in $B^+Tree(T_{[6]})$. Since another occurrence of $Key_2$ is not found in $B^+Tree(T_{[6]})$, $AddJoinKey(T_{[2]}, DP_2, Key_2, InheritedKey_2)$ ends, and insertion of the first row of table Departments 606 is complete.

Figure 14F:
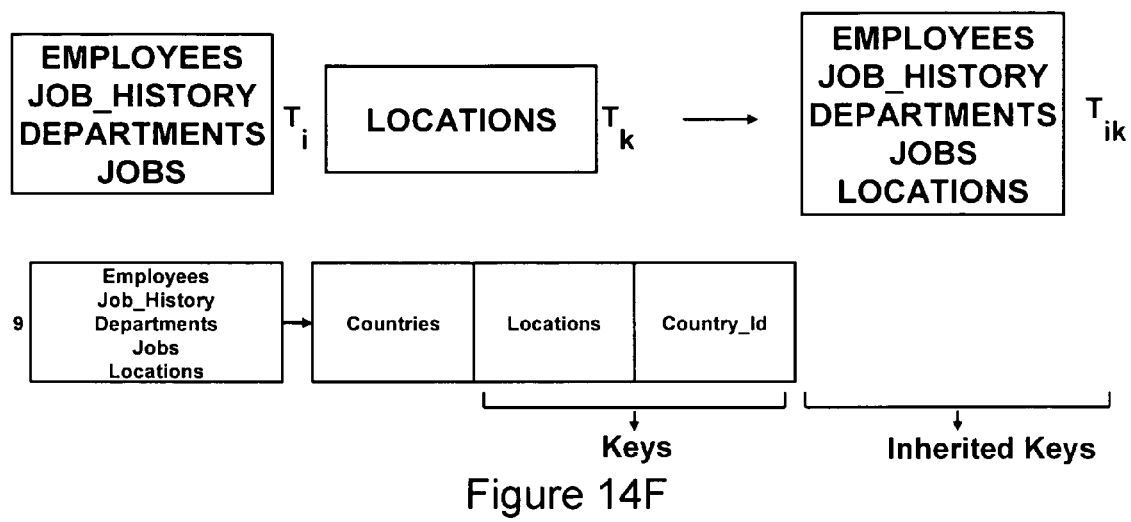

FIGS. 14A-G illustrate the steps involved in inserting the data pointer and data elements from the first row ("$R_{m=0}$") of table Jobs 608 ("$T_{[i=3]}$") into the $B^{Join}Tree$. First, $T_{[3]}$ is located in JoinPathList 900, and the definitions of $Key_3$ and $InheritedKey_3$ are identified, as shown in FIG. 14A (as can be seen from JoinPathList 900, there is no inherited table or inherited key for $T_{[3]}$). Next, the data element for $Key_3$ is obtained from $R_0$, as shown in FIG. 14B. Then, the recursive function $AddJoinKey(T_{[3]}, DP_3, Key_3, InheritedKey_3)$ is called, and $DP_3$, and $Key_3$ are inserted into $B^+Tree(T_{[3]})$, as shown in FIG. 14C.

Next, the adjacent table $T_{[k=7]}$ (Employees Job_History Departments) for $T_{[3]}$ is identified from JoinPathList 900, and $Key_3$ is searched for in $B^+Tree(T_{[7]})$. Since $Key_3$ ("AC_AUD") is found in $B^+Tree(T_{[7]})$, as shown in FIG. 13E, $DP_7$, $Key_7$ and $InheritedKey_7$ are obtained from $B^+Tree(T_{[7]})$. Next, table $T_{[ik=8]}$ (Employees Job_History Departments Jobs) is located in JoinPathList 900, and the definitions of $Key_8$ and $InheritedKey_8$ are identified, as shown in FIG. 14D (as can be seen from JoinPathList 900, there is no inherited table or inherited key for $T_{[8]}$). Then, the data element from $Key_3$, $Key_7$ and $InheritedKey_7$ which fits the definition of $Key_8$ is identified, along with $DP_8$, which comprises both $DP_3$ and $DP_7$. Then, the recursive function $AddJoinKey(T_{[8]}, DP_8, Key_8, InheritedKey_8)$ is called, and $DP_8$ and $Key_8$ are inserted into $B^+Tree(T_{[8]})$ as shown in FIG. 14E.

Figure 14G:
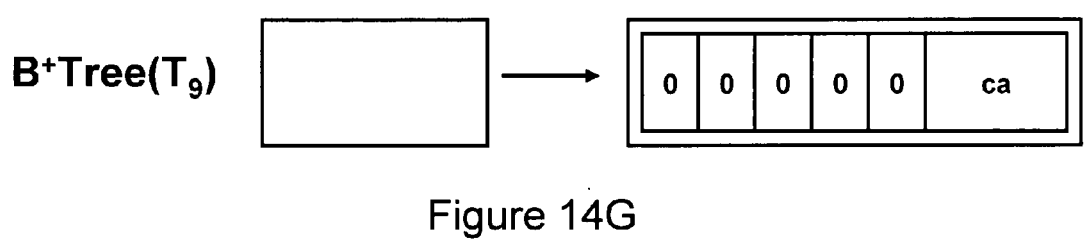

Next, the adjacent table $T_{[k=4]}$ (Locations) for $T_{[8]}$ is identified from JoinPathList 900, and $Key_8$ is searched for in $B^+Tree(T_{[4]})$. Since $Key_8$ ("1000") is found in $B^+Tree(T_{[4]})$, as shown in FIG. 12C, $DP_4$, $Key_4$ and $InheritedKey_4$ are obtained from $B^+Tree(T_{[4]})$. Next, table $T_{[ik=9]}$ (Employees Job_History Departments Jobs Locations) is located in JoinPathList 900, and the definitions of $Key_9$ and $InheritedKey_9$ are identified, as shown in FIG. 14F (as can be seen from JoinPathList 900, there is no inherited table or inherited key for $T_{[9]}$). Then, the data element from $Key_8$, $Key_4$ and $InheritedKey_4$ which fits the definition of $Key_9$ is identified, along with $DP_9$, which comprises both $DP_8$ and $DP_4$. Then, the recursive function $AddJoinKey(T_{[9]}, DP_9, Key_9, InheritedKey_9)$ is called, and $DP_9$ and $Key_9$ are inserted into $B^+Tree(T_{[9]})$ as shown in FIG. 14G.

Next, the adjacent table $T_{[k=5]}$ (Countries) for $T_{[9]}$ is identified from JoinPathList 900, and $Key_9$ searched for in $B^+Tree(T_{[5]})$. Since $B^+Tree(T_{[5]})$ is still empty, the recursive function $AddJoinKey(T_{[9]}, DP_9, Key_9, InheritedKey_9)$ ends and returns to complete $AddJoinKey(T_{[8]}, DP_8, Key_8, InheritedKey_8)$, where another occurrence of $Key_8$ is searched for in $B^+Tree(T_{[4]})$. Since no other occurrence of $Key_8$ is found in $B^+Tree(T_{[4]})$, the recursive function $AddJoinKey(T_{[8]}, DP_8, Key_8, InheritedKey_8)$ ends and returns to complete $AddJoinKey(T_{[3]}, DP_3, Key_3, InheritedKey_3)$, where another occurrence of $Key_3$ is searched for in $B^+Tree(T_{[7]})$. Since no other occurrence of $Key_3$ is found in $B^+Tree(T_{[7]})$ insertion of the first row of table Jobs 608 is complete.

Figure 15A:
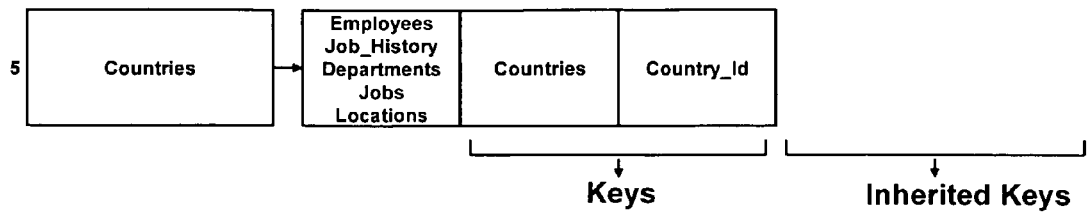
Figure 15B:
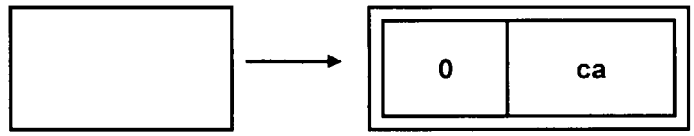

FIGS. 15A-E illustrate the steps involved in inserting the data pointer and data elements from the first row ("$R_{m=0}$") of table Countries 612 ("$T_{[i=5]}$") into the $B^{Join}Tree$. First, $T_{[5]}$ is located in JoinPathList 900, and the definitions of $Key_5$ and $InheritedKey_5$ are identified, as shown in FIG. 15A (as can be seen from JoinPathList 900, there is no inherited table or inherited key for $T_{[5]}$). Next, the data element for $Key_5$ is obtained from $R_0$, as shown in FIG. 15B. Then, the recursive function AddJoinKey($T_{[5]}$, $DP_5$, $Key_5$, $InheritedKey_5$) is called, and $DP_5$ and $Key_5$ are inserted into $B^+Tree(T_{[5]})$, as shown in FIG. 15C.

Figure 15D:
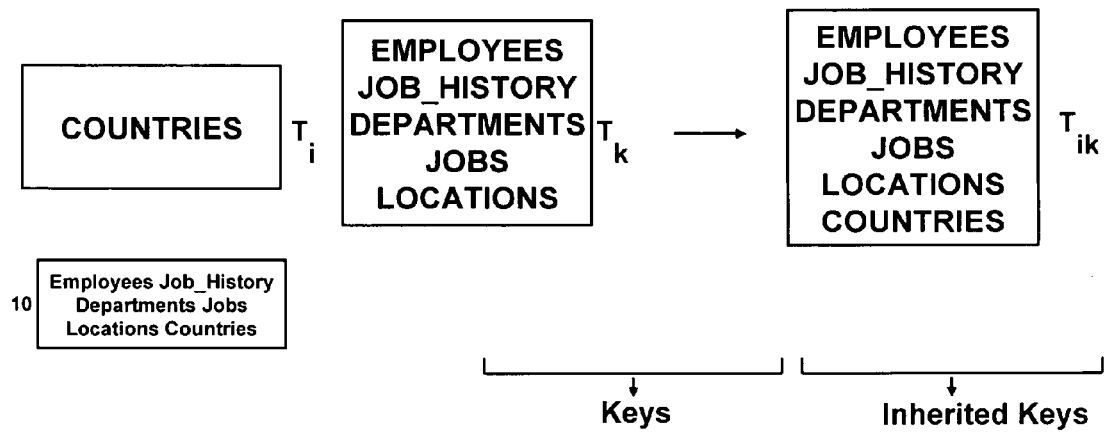
Figure 15E:
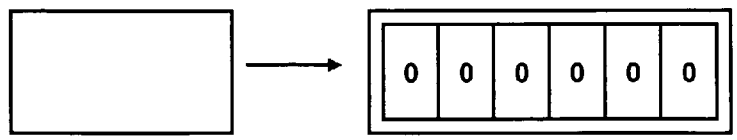

Next, the adjacent table $T_{[k=9]}$ (Employees Job_History Departments Jobs Locations) for $T_{[5]}$ is identified from Join-PathList 900, and $Key_5$ is searched for in $B^+Tree(T_{[9]})$. Since $Key_5$ ("ca") is found in $B^+Tree(T_{[9]})$, as shown in FIG. 14G, $DP_9$ and $Key_9$ are obtained from $B^+Tree(T_{[9]})$. Next, table $T_{[ik=10]}$ (Employees Job_History Departments Jobs Locations Countries) is located in JoinPathList 900, and the definitions of $Key_{10}$ and $InheritedKey_{10}$ are identified, as shown in FIG. 15D (as can be seen from JoinPathList 900, the adjacent list for $T_{[10]}$ is empty). Then, the recursive function AddJoinKey($T_{[10]}$, $DP_{10}$, $Key_{10}$, $InheritedKey_{10}$) is called, and $DP_{10}$, which comprises both $DP_5$ and $DP_9$, is inserted into $B^+Tree(T_{[10]})$ as shown in FIG. 15E.

Next, since there is no adjacent table for $T_{[10]}$, the recursive function AddJoinKey($T_{[10]}$, $DP_{10}$, $Key_{10}$, $InheritedKey_{10}$) ends and returns to complete AddJoinKey($T_{[5]}$, $DP_5$, $Key_5$, $InheritedKey_5$), where another occurrence of $Key_5$ is searched for in $B^+Tree(T_{[9]})$. Since no other occurrence of $Key_5$ is found in $B^+Tree(T_{[9]})$, insertion of the first row of table Countries 612 is complete.

The above method is then repeated for all of the remaining rows of base tables 602-612. This results in further entries being added to each of the $B^+Trees$ of $B^{Join}Tree$. FIGS. 16A-K show the completed $B^+Tree(T_{[0]})$ to $B^+Tree(T_{[10]})$, respectively.

As can be seen in FIG. 16K, each entry of $B^+Tree(T_{[10]})$ comprises a list of six data pointers which identify joined rows of the six base tables 602-612. For example, the second entry 902 of $B^+Tree(T_{[10]})$ indicates that the first row of table Employees 602 (identified by the row number "0"), the third row of table Job_History 604 (identified by the row number "2"), the first row of table Departments 606 (identified by the row number "0"), the fifth row of table Jobs 608 (identified by the row number "4"), the first row of table Locations 610 (identified by the row number "0") and the first row of table Countries 612 (identified by the row number "0") are all joined.

A database administrator may create a $B^{Join}Tree$ for a set of tables in join in a database. In systems according to one embodiment of the invention the database administrator can declare the set of tables in join and the common keys. The system internally generates the JoinGraph and JoinPathList to create the corresponding $B^{Join}Tree$. Any time such a set of tables in join is queried, the system can quickly return all rows which are in join by simply scanning the indexing data structure of the $B^{Join}Tree$ for the virtual table which comprises the names of all of the set of tables in join. This information is then available to the entity that requested the query without waiting for the join specified by the query to be calculated. The identification of rows in join may be used to rapidly identify relationships between rows from different tables of the database.

In practice, a database administrator may create a plurality of $B^{Join}Trees$ for a database, one for each join sequence required for common or expected queries. If a query is received which requires a join sequence different from those for which $B^{Join}Trees$ have already be defined, the database administrator may create a new $B^{Join}Tree$ for that query, or the database could compute the join in any suitable way. The new $B^{Join}Tree$ will then be available if another similar query is received in the future.

As described above, creating a $B^{Join}Tree$ involves scanning each of the base tables of a join sequence only once. Therefore, the time required to create a $B^{Join}Tree$ for n tables $T_0 \ldots T_{n-1}$ with cardinalities $l_0 \ldots l_{n-1}$, respectively, varies with the sum of the cardinalities ($l_0 + \ldots + l_{n-1}$). In contrast, in order to calculate a join for the same tables by taking the first row from table $T_0$, looking for all the rows in $T_1$ that satisfy the join with that first row, repeating with all the remaining rows of $T_0$ for $T_1$, then repeating the whole process with each row of $T_0$ for tables $T_2 \ldots T_{n-1}$, the execution time required would vary with the product of the cardinalities ($l_0^* \ldots *l^{n-1}$). Some prior art systems use various methods to reduce the execution time required to calculate such joins, but as one skilled in the art will appreciate, creation of a $B^{Join}Tree$ may be more convenient in any situations, since it does not require any special database schema, and the $B^{Join}Tree$ may be saved for use with future queries.

When a database which is provided with a system according to one embodiment of the invention is updated, for example by inserting one or more rows into the base tables, or by deleting one or more rows from the base tables, any $B^{Join}Trees$ which have been created for that database may also be updated. For example, any time a row is inserted into one of the base tables by a database management system, the above described insertion method and recursive add function may be called by the database management system to update the $B^{Join}Trees$. Likewise, if a row is deleted from one of the base tables, the above described deletion method and recursive delete function may be used to update the $B^{Join}Trees$. If an existing row is to be modified, the modification may be accomplished, for example, by deleting the existing row and inserting the modified row. Accordingly, a database does not need to be read only for the $B^{Join}Trees$ to be able to provide reliable indications of rows in join.

Figure 17:
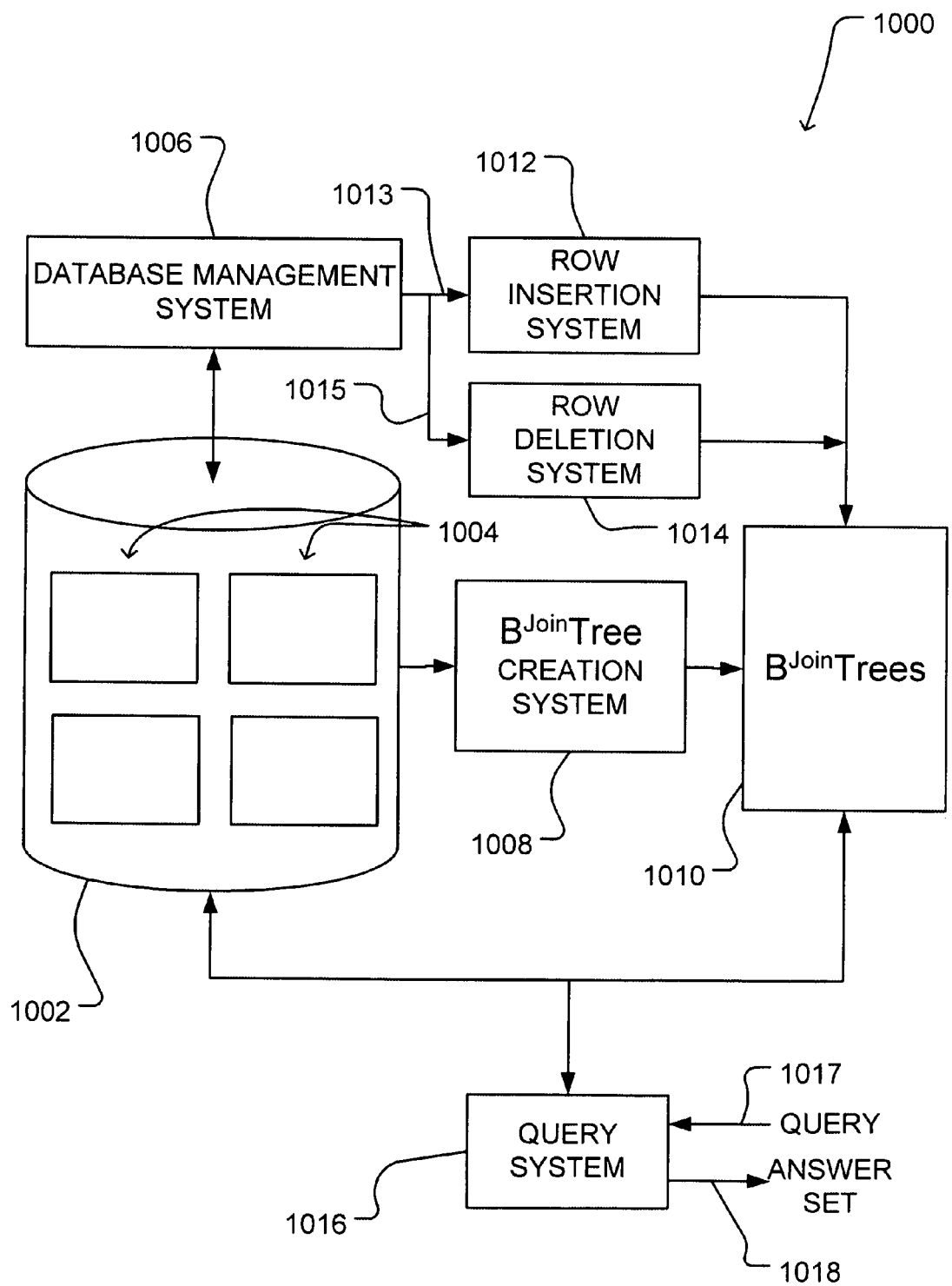
FIG. 17 shows a database system for creating and updating $B^{Join}$Trees according to one embodiment of the invention; and, FIG. 18 shows an example $B^{Join}$Tree creation system for the database system of FIG. 17.

FIG. 17 shows a database system 1000 according to one embodiment of the invention. Database system 1000 comprises a database 1002 having a plurality of tables 1004 stored therein. Database 1002 and tables 1004 may be modified by a database management system 1006. Database management system 1006 may be used to insert or delete rows of data in tables 1004 by a database administrator, authorized users, and/or automated data processing systems.

Database system 1000 comprises a $B^{Join}Tree$ creation system 1008 which may be used by the database administrator to create one or more $B^{Join}Trees$ 1010 for database 1002. $B^{Join}Tree$ creation system 1008 may implement one or more methods according to the invention in order to create $B^{Join}Trees$ 1010. An example $B^{Join}Tree$ creation system 1008 is shown in FIG. 18 and described further below.

Database system 1000 may also comprise a row insertion system 1012 and a row deletion system 1014. Database management system 1006 may be configured to provide row addition signals 1013 and row deletion signals 1015 to row insertion system 1012 and row deletion system 1014, respectively, whenever rows are added to or deleted from tables 1004 of database 1002. Row insertion system 1012 and row deletion system 1014 may be configured to automatically update $B^{Join}Trees$ 1010 upon receipt of a row insertion signal 1013 or a row deletion signal 1015 from database management system 1006.

Database system 1000 may also comprise a query system 1016. Query system 1016 may be used to retrieve data from tables 1004 of database 1002 in response to a query 1017 and provide an answer set 1018 to a user. When a query 1017 requires the identification of joined rows, query system 1016 may obtain a list of all rows of tables 1004 of database 1002 in join by scanning the indexing data structures stored in one of the $B^{Join}Trees$ 1010 which corresponds to the join sequence required for query 1017. Query system 1016 may then use the list received from that $B^{Join}Tree$ 1010 to retrieve data from the identified rows of tables 1004 of database 1002 for use in answer set 1018. If B$^{Join}$Trees 1010 do not contain an indexing data structure which satisfies the join condition specified in query 1017, a new B$^{Join}$Tree may be created in B$^{Join}$Trees 1010 by B$^{Join}$Tree creation system 1008. Alternatively or additionally, query system 1016 may optionally execute a join according to any suitable known method.

Figure 18:
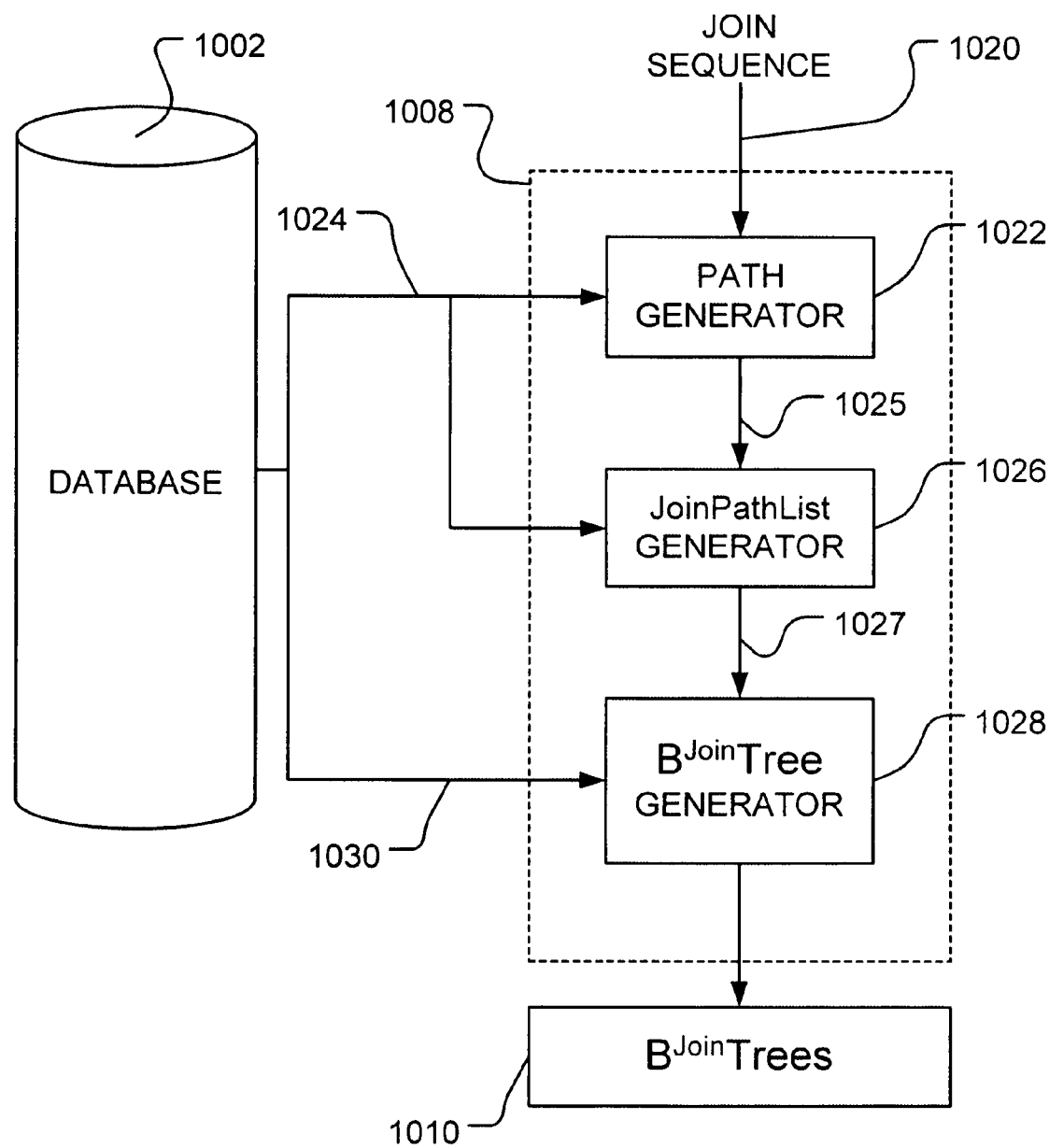

FIG. 18 shows an example B$^{Join}$Tree creation system 1008. B$^{Join}$Tree creation system 1008 is configured to receive a join sequence 1020 comprising a group of tables specified by the database administrator. Join sequence 1020 is received by a path generator 1022 which retrieves information 1024 about relationships between the tables of join sequence 1020 from database 1002. Path generator 1022 generates a path 1025 comprising an ordered list of the tables in join sequence 1020. The ordered list of tables may begin with any arbitrarily selected table of join sequence 1020. The next tables in the ordered list may be the tables in direct join with the arbitrarily selected table, followed by tables which are separated from the arbitrarily selected table by two direct joins, and so on. A JoinPathList generator 1026 receives information 1024 and path 1025 and generates a JoinPathList 1027. JoinPathList 1027 is received by a B$^{Join}$Tree generator 1028 which retrieves information 1030 from rows of the tables in join sequence 1020 from database 1002 in order to generate a B$^{Join}$Tree 1010 for join sequence 1020. It is to be understood that B$^{Join}$Tree creation system 1008 shown in FIG. 18 is illustrated for example only, and that other configurations of a B$^{Join}$Tree creation system 1008 are possible without departing from the spirit or scope of the invention.

Because a B$^{Join}$Tree comprises an indexing data structure that indicates all rows in join, systems according to the invention are able to locate rows in join at any time without the need to calculate joins every time a query is executed. Systems according to preferred embodiments of the invention have the further advantage of being able to be used with existing databases without requiring limits on the number of distinct values which may be in a column, and without requiring a specific relationship schema. For huge tables such as those in data warehouses, the time required to execute a query, which may take hours with certain prior art systems, may be reduced to seconds with some systems according to the invention.

Certain implementations of the invention comprise computer processors which execute software instructions which cause the processors to perform a method of the invention. For example, one or more processors in a database system may implement the methods described herein, and/or the algorithms of FIGS. 2A, 3A-D and 7A-E by executing software instructions in a program memory accessible to the processors. The invention may also be provided in the form of a program product. The program product may comprise any medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The instructions may optionally be compressed and/or encoded.

In another implementation, systems according to some embodiments of the invention could be incorporated as an index engine in a database management system for a database system designed to be used with B$^{Join}$Trees. In such an implementation, the SQL create index declaration may be extended to include indexing on multiple tables.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A computer implemented method for identifying joined rows in a database comprising a plurality of tables, the method configuring one or more processors to perform an operation comprising:
    selecting a group of tables from the plurality of tables, each table of the group of tables being directly or indirectly joined with each of the other tables in the group of tables;
    selecting an order of the group of tables based on relationships among the group of tables;
    generating an intermediate data structure comprising information identifying each of the group of tables, a number of virtual tables equal to one less than a number of tables of the group of tables, each virtual table comprising information identifying two or more tables of the group of tables, and an indication of an adjacent table, a common table and a common key for at least some tables of the group of tables or the virtual tables;
    generating an indexing data structure for each table of the group of tables and each virtual table of the virtual tables;
    inserting data pointers and data elements from rows of the group of tables into the indexing data structures using the intermediate data structure,
    wherein the indexing data structure for one of the virtual tables indicates which of the rows of the group of tables have common data elements; and
    wherein selecting the order of the group of tables comprises:
        (a) creating first and second auxiliary data structures;
        (b) inserting one of the group of tables into the first and second auxiliary data structures;
        (c) designating a first table in the first auxiliary data structure as a current table;
        (d) for each adjacent table of the group of the tables that has at least one column which corresponds to a column of the current table and has not already been inserted in the second auxiliary data structure, inserting the adjacent table into the first and second auxiliary data structures;
        (e) removing the current table from the first auxiliary data structure; and
        (f) repeating steps (c) to (e) until the first auxiliary data structure is empty.

2. A computer implemented method for identifying joined rows in a database comprising a plurality of tables, the method configuring one or more processors to perform an operation comprising:
    selecting a group of tables from the plurality of tables, each table of the group of tables being directly or indirectly joined with each of the other tables in the group of tables;
    selecting an order of the group of tables based on relationships among the group of tables;
    generating an intermediate data structure comprising information identifying each of the group of tables, a number of virtual tables equal to one less than a number of tables of the group of tables, each virtual table comprising information identifying two or more tables of the group of tables, and an indication of an adjacent table, a common table and a common key for at least some tables of the group of tables or the virtual tables;

generating an indexing data structure for each table of the group of tables and each virtual table of the virtual tables;

inserting data pointers and data elements from rows of the group of tables into the indexing data structures using the intermediate data structure, wherein the indexing data structure for one of the virtual tables indicates which of the rows of the group of tables have common data elements;

wherein generating the intermediate data structure comprises:

generating a nodes list comprising the names of each of the group of tables arranged in the order, followed by the number of virtual tables, the first virtual table comprising the first two tables in the order, and the last virtual table comprising all of the group of tables; and, generating an adjacent list containing the indication of the adjacent table, the common table and the common key for at least one of the group of tables and the number of virtual tables.

3. A method according to claim 2 wherein selecting the order of the group of tables comprises arbitrarily selecting one table of the group of tables as a first table and selecting tables of the group of tables in direct join with the first table as a second group of tables to follow the first table.

4. A method according to claim 3 wherein selecting the order of the group of tables further comprises selecting tables of the group of tables in direct join with any of the second group of tables other than the first table as a third group of tables to follow the second group of tables.

5. A method according to claim 2 wherein generating the intermediate data structure further comprises:

inserting definitions of an inherited table and an inherited key into the adjacent list for one or more of the tables virtual tables.

6. A method according to claim 2 wherein generating an indexing data structure for each of the tables and each of the virtual tables comprises generating a B$^+$Tree for each of the tables and each of the virtual tables.

7. A method according to claim 2 wherein inserting data pointers and data elements from rows of the group of tables into the indexing data structures comprises inserting a data pointer identifying a designated row of a designated table and at least one data element from the designated row of the designated table into the indexing data structures.

8. A method according to claim 7 wherein inserting the data pointer identifying the designated row of the designated table and at least one data element from the designated row of the designated table into the indexing data structures comprises calling a recursive add function having the designated table, the data pointer identifying the designated row and at least one data element of the designated row as inputs.

9. A method according to claim 8 wherein calling the recursive add function comprises:

locating an adjacent table for the designated table;

searching for a data element of the designated row in the indexing data structure for the adjacent table, and if found:

locating a data pointer identifying a row containing the found data element from the indexing data structure of the adjacent table;

locating a virtual table which comprises the designated table and the adjacent table;

locating any data element from the indexing data structures of the designated table and the adjacent table which corresponds to a definition of the common key or an inherited key for the located virtual table; and calling the recursive add function having the located virtual table, the data pointer identifying the designated row and the located data pointer identifying the row containing the found data element, and any located data element from the indexing data structures of the designated table and the adjacent table as inputs.

10. A method according to claim 8 comprising, when a row is added to one of the tables, automatically updating the indexing data structures by inserting a data pointer identifying the added row and at least one data element from the added row into the indexing data structures by calling the recursive add function having the table of the added row, the data pointer identifying the added row and at least one data element from the added row as inputs.

11. A method according to claim 8 comprising, when a row is deleted from one of the tables, automatically updating the indexing data structures by removing a data pointer identifying the deleted row and at least one data element from the deleted row from the indexing data structures by calling a recursive delete function having the table of the deleted row, the data pointer identifying the deleted row and at least one data element of the deleted row as inputs.

12. A method according to claim 2 wherein the one of the virtual tables whose indexing data structure indicates which of the rows of the group of tables have common data elements comprises information identifying all tables of the group of tables.

\* \* \* \* \*